US007408676B2

(12) United States Patent
Yazawa et al.

(10) Patent No.: US 7,408,676 B2
(45) Date of Patent: Aug. 5, 2008

(54) INK JET PRINTING WITH SWITCHED USE OF PARTICULAR COLOR INK DEPENDING ON NUMBER OF PRINT HEAD PASSES CORRESPONDING TO PRINT QUALITY AND SPEED

(75) Inventors: Takeshi Yazawa, Kanagawa (JP); Hiroshi Tajika, Kanagawa (JP); Hitoshi Nishikori, Tokyo (JP); Daisaku Ide, Tokyo (JP); Atsuhiko Masuyama, Tokyo (JP); Akiko Maru, Kanagawa (JP); Hirokazu Yoshikawa, Kanagawa (JP); Hideaki Takamiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 819 days.

(21) Appl. No.: 10/912,113

(22) Filed: Aug. 6, 2004

(65) Prior Publication Data

US 2005/0035995 A1 Feb. 17, 2005

(30) Foreign Application Priority Data

Aug. 11, 2003 (JP) ............................ 2003-291874

(51) Int. Cl.
*H04N 1/50* (2006.01)
*H04N 1/60* (2006.01)
*B41J 2/01* (2006.01)
*B41J 29/38* (2006.01)

(52) U.S. Cl. ....................... 358/1.9; 358/3.24; 358/502; 358/518; 347/6; 347/14

(58) Field of Classification Search .................. 358/1.9, 358/1.8, 3.24, 502, 518, 540; 347/5, 6, 14, 347/43

See application file for complete search history.

(56) References Cited

U.S. PATENT DOCUMENTS

| | | | | |
|---|---|---|---|---|
| 6,036,300 A | | 3/2000 | Suzuki et al. | |
| 6,120,129 A | | 9/2000 | Iwasaki et al. | |
| 6,260,938 B1 | | 7/2001 | Ohtsuka et al. | |
| 6,264,305 B1 | | 7/2001 | Inui et al. | |
| 6,310,640 B1 | * | 10/2001 | Askeland | 347/41 |
| 6,325,489 B2 | * | 12/2001 | Endo | 347/43 |
| 6,543,872 B2 | | 4/2003 | Ohtsuka et al. | |
| 7,182,453 B2 | * | 2/2007 | Nakajima | 347/41 |
| 2002/0011178 A1 | | 1/2002 | Kanke et al. | |

FOREIGN PATENT DOCUMENTS

| | | |
|---|---|---|
| JP | 5-309874 | 11/1993 |
| JP | 8-244254 | 9/1996 |
| JP | 2002-69348 | 3/2002 |

* cited by examiner

*Primary Examiner*—Scott A Rogers
(74) *Attorney, Agent, or Firm*—Fitzpatrick, Cella, Harper & Scinto

(57) ABSTRACT

When three primary color inks and a particular color ink having a hue different from those of the three colors are used, the number of passes with regard to the same printing area is changeable, thereby speeding up a printing operation and improving color development at a gamut expressed by the particular color ink to achieve high quality images. Use or non-use of the particular color ink is switched according to the number of passes corresponding to quality information. If a high speed data generation processing is not required but sufficient color development is achieved, namely if the number of passes is large, the use of the particular color will expand the color reproduction gamut. If the high speed is required, namely if the number of passes is small, non-use of the particular color ink will reduce the number of colors of the usable inks.

15 Claims, 19 Drawing Sheets

INK JET PRINTING WITH SWITCHED USE OF PARTICULAR COLOR INK DEPENDING ON NUMBER OF PRINT HEAD PASSES CORRESPONDING TO PRINT QUALITY AND SPEED

BACKGROUND OF THE INVENTION

1. Field of the Invention

The present invention relates to an ink jet printing method, a program for carrying out the method and an ink jet printing apparatus, and more specifically, it relates to the method applicable to a system including an ink jet printing apparatus using of three subtractive primary printing agents (ink) and a particular printing agent (ink) having hue different therefrom.

2. Description of the Related Art

A so-called serial scanning type image printing apparatus has been widely used for forming various images, wherein the printing operation is carried out while scanning a printing medium with a printing head which is a printing means. Particularly, such an image printing apparatus belonging to an ink jet system has rapidly prevailed in the market because the resolution or colorization has recently been improved to significantly increase the image quality. While a so-called multi-nozzle head in which ejection openings for ejecting ink, in the form of droplet for example, are disposed at a high density is used in the apparatus of this kind, it has been possible at present to form an image of high resolution by increasing the integrated density of the ejection openings.

Under such a condition, if the number of ink droplets ejected to a unit area of the printing medium in one main scan increases, the ink is liable to blot between ink dots formed on the printing medium. Accordingly, there may be a case in that an image is formed in the same area of the printing medium by a plurality of main scans wherein the printing is carried out so that the respective main scan has a complementary relationship to the other.

By adopting such a printing method, since image data printed by one main scan is properly thinned and all the image data are formed by the plurality of main scans, an amount of ink to be imparted to a unit area of the printing medium by one main scan is decreased, whereby the blot of ink decreases. Since such an effect is enhanced as the number of main scans (the number of passes) is large in the same printing area, it is preferable to increase the number of passes for the purpose of obtaining a high quality image due to the reduction of the blots. When the number of the passes increases however, the total printing time increases so as to decrease to disturb the high speed operation. As described above, the high quality image and the high speed operation are in a trade-off relationship.

To reconcile the high quality image with the high speed operation, there is a method wherein the number of passes is changed in accordance with amounts of ink to be imparted (for example, see Japanese Patent Application Laid-open No. 5-309874 (1993)). More specifically, according to Japanese Patent Application Laid-open No. 5-309874 (1993), the number of passes is changed to be larger or smaller in accordance with amounts of ink to be imparted, because when the amount of ink is increased, the blot of ink is liable to occur, and vice versa.

On the other hand, as the color ink jet printing apparatus has rapidly prevailed at present, further improvement in the quality of color image is desired. Particularly, a clear output image is desired, having a wider color area which could be reproduced by the printing apparatus. In this regard, it is possible to enlarge a color reproduction area in which one of three colors; yellow, magenta and cyan; can be reproduced, by improving the color development characteristic or the condensation of a color material of the printing agent (ink). However, it is difficult to reproduce a clearer color in red, green and blue areas formed by two or more printing agents, especially in a color area having a high chroma, solely by using three colors of yellow, magenta and cyan or four colors adding black thereto, because there is a limit in the color area capable of being reproduced thereby.

To enlarge the color reproduction area, it has been known to use particular color inks such as red, green or blue, in addition to three color inks of subtractive primary colors; yellow, magenta and cyan; or four color inks in which black is further added to the former, each of the particular color inks having a medium hue angle between them in the color space (for example, see Japanese Patent Application Laid-open No. 8-244254 (1996)). In this Japanese Patent Application Laid-open No. 8-244254 (1996), it is contemplated, in addition to the enlargement of the color reproduction area, to reduce the blotting of ink by using the particular color inks. That is, according to Japanese Patent Application Laid-open No. 8-244254 (1996), the area of secondary colors (red, green and blue) is not expressed by the mixture of inks, but expressed by directly using the particular color inks as they are, whereby an amount of ink applied to a unit area is reduced to minimize the ink blotting. In such a manner, when the particular color inks are used, it is possible to reduce the blotting of ink since the ink amount can be decreased when the area of the secondary colors is formed.

SUMMARY OF THE INVENTION

As described above, when the particular color ink is used, the ink amount necessary for forming the secondary color area becomes less than when the particular color ink is not used. Accordingly, when it is desired that a high quality image is compatible with the high speed operation in the system using the particular color ink, it could be thought to control the system based on the technical level disclosed in Japanese Patent Application Laid-open No. 8-244254 (1996) described above so that the number of passes is relatively small to speed up the printing operation when the particular color ink is used wherein the applied ink amount is liable to decrease, while the number of passes is made to be relatively large when the particular color ink is not used wherein the applied ink amount is liable to increase. In other words, a method is reached that in a mode wherein the number of passes is relatively small, the particular color ink is positively used, while in a mode wherein the number of passes is relatively large, no particular color ink is used.

The present inventors have found, however, that although it is effective for the compatibility of the reduction of the number of passes with the high quality image if such a method is adopted, it is insufficient for achieving the high quality image due to the enlargement of color reproduction area which is one of the inherent objects for using the particular color ink. That is, the present inventors have recognized that, while it is important to improve the color development in a color gamut represented by the particular color ink for enlargement of the color reproduction area, even if the particular color ink is used in the mode in which the number of passes is relatively small as in the above method, it is impossible to leave much particular printing agent on the surface of the printing medium and sufficiently develop the color of the color gamut represented by the particular color ink. Thereby, according to such a method, while the particular color ink is excessively consumed, the object for enlarging the color gamut is not achievable.

The present invention has been made under such circumstances and the object thereof is to provide an ink jet printing method, and a program and an apparatus for carrying out this method, capable of improving the color development in the color gamut represented by the particular color ink to obtain a high quality image while speeding up the printing operation by constituting a system so that the number of main scans (the number of passes) is variable in the same printing area.

In the first aspect of the present invention, there is provided an ink jet printing method in which a printing head capable of ejecting three colors of inks such as cyan, magenta and yellow and a particular color ink having hue different from those of the three colors carries out the plurality number of main scans relatively with regard to the same area of a printing medium, the method comprising the steps of:

obtaining information corresponding to the number of main scans; and printing onto the printing medium causing the printing head to carry out main scans for the number of times corresponding to thus obtained information with regard to the same area of the printing medium;

wherein, the printing step is performed without using the particular color ink when the number of times corresponding to thus obtained information is less than or equal to the predetermined number of times, and the printing step is performed allowing the particular color ink to be used when the number of times corresponding to thus obtained information exceeds the predetermined number of times.

In the second aspect of the present invention, there is provided an ink jet printing method including a main scanning operation in which a printing head having a plurality of ink ejection ports for ejecting three colors of inks such as cyan, magenta and yellow and a particular color ink having hue different from the three colors, the ink ejection ports being arranged in the printing head, carries out main scans relatively with regard to a printing medium in a direction different from the arrangement direction of the ink ejection ports, and a sub-scanning operation in which the printing medium is sub-scanned in a direction orthogonal to the main scanning direction relatively with regard to the printing head, the method comprising the steps of:

selecting a single printing mode for printing among a plurality of printing modes including a first printing mode in which the printing head carries out main scans to print onto the same area of the printing medium for the first number of times, and a second printing mode in which the printing head carries out main scans to print onto the same area of the printing medium for the second number of times that is larger than the first number of times; and printing onto the printing medium by the selected printing mode;

wherein the printing step performs printing without using the particular color ink when the first printing mode is selected, and the printing step performs printing allowing the particular color ink to be used when the second printing mode is selected.

In the third aspect of the present invention, there is provided a program for causing a printing head capable of ejecting three color inks such as cyan, magenta and yellow and a particular color ink having hue different from those of the three colors to carry out a plurality of main scans relatively with regard to the same area of the printing medium to print on the print medium, the program causing a computer to execute the steps of:

obtaining information regarding the number of main scans; and generating data corresponding to the three color inks but suspending to generate data corresponding to the particular color ink when the number of times corresponding to the obtained information is less than or equal to the predetermined times, and generating data corresponding to the particular color ink and the three color inks when the number of times corresponding to the obtained information exceeds the predetermined number of times.

In the fourth aspect of the present invention, there is provided a program for causing a printing head capable of ejecting inks of three colors such as cyan, magenta and yellow and a particular color ink to carry out a plurality of main scans relatively with regard to the same area of the printing medium, the program causing the computer to execute the steps of:

obtaining information regarding one printing mode selected from a plurality of printing modes including a first printing mode in which the printing head carries out main scans onto the same area of the printing medium for the first number of times to print on the same area of the printing medium, and a second printing mode in which the printing head carries out main scans onto the same area of the printing medium for the second number of times that is larger than the first number of times to print on the same area of the print medium; and generating data corresponding to the three color inks but suspending to generate data corresponding to the particular color ink when the obtained information is information regarding the first printing mode, and generating data corresponding to the particular color ink and the three color inks when the obtained information is information regarding the second printing mode.

In the fifth aspect of the present invention, there is provided an ink jet printing apparatus in which a printing head capable of ejecting inks of three colors such as cyan, magenta and yellow and a particular color ink having hue different from those of the three colors carries out a plurality of main scans relatively with regard to the same area of a printing medium to print thereon, the apparatus comprising:

a plurality of printing modes including a first printing mode for causing the printing head to carry out main scans onto the same area of the printing medium for the first number of times to print on the same area of the printing medium and a second mode for causing the printing head to carry out main scans onto the same area of the printing medium for the second number of times that is larger than the first number of times to print on the same area of the printing medium, and means for printing without using the particular color ink when the first printing mode is selected, and for printing using the particular color ink when the second printing modes is selected.

According to the present invention, it is possible to obtain a high quality image while speeding up the printing operation by constituting a system so that the number of main scans (the number of passes) is variable in the same printing area.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The present invention will be described in detail below with reference to the attached drawings.

In this specification, a particular color is defined in a broad sense as those different in hue from yellow, magenta and cyan which are printing agents of basic colors. In a narrow sense, the particular color is defined as colors capable of representing at least one of higher lightness and chroma in a CIE-L*a*b* color space than in a color reproduction area represented on the printing medium by the combination of any two basic color printing agents; magenta, yellow and cyan; as well as a color representing a hue angle in the color reproduction area represented by the above-mentioned combination of any two printing agents.

In the present invention, the printing agent of the particular color in the narrow sense described above is preferably used, but the wide sense may also be used.

(Feature of the Present Invention)

According to the present invention, a control operation is carried out in such a manner that, in a printing mode (a first printing mode) in which the number of passes of the printing head is relatively small in the same area of the printing medium (an area corresponding to one raster or an area corresponding to a width in a sub-scanning direction capable of being printed by one main scan of the printing head ejecting ink of certain color), the printing operation is carried out without using particular color ink, but in a printing mode (a second printing mode) in which the number of passes of the printing head is relatively large, the printing operation is carried out while using the particular color ink.

A reason why such a control is carried out will be explained with reference to FIGS. 1A, 1B and 2A-2E.

Figure 1A:
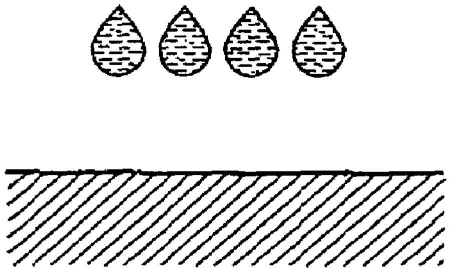
FIGS. 1A and 1B are illustrations for explaining the penetration of ink when the number of main scans (the number of passes) carried out in the same area is small in the multi-pass printing method.
Figure 1B:

First, in the printing mode in which the number of passes is relatively small, the number of ink droplets simultaneously ejected to the same area on the printing medium by one main scan becomes relatively large as shown in FIG. 1A. These ink droplets reaching the printing medium substantially at the same time deeply permeate the printing medium while being united together by ink solvent and are fixed as shown in FIG. 1B. It is thought that this is because the drying of ink (vaporization of ink solvent component) is slower as the surface area of ink per unit volume is smaller, while the ink more deeply permeates the printing medium when the drying is insufficient.

It is possible to reduce an amount of ink to be imparted to a unit area of the printing medium by one main scan by using the particular color ink. In the multi-pass printing method, however, since the image is formed on the printing medium by a plurality of main printing scans in accordance with the dot arrangement in which a complementary relationship exists among the plurality of main scans, the amount of ink imparted at the same time to the same printing area increases as the number of passes decreases, whereby it is unavoidable that the ink deeply permeates the printing medium. Accordingly, even if the ink droplet of the particular color ink is contained in a plurality of ink droplets ejected to the same area at the same time, the printing agent of the particular color ink left on the surface of the printing medium decreases. Then, it is impossible to have a sufficient color development in the color gamut represented by the particular color ink, and it is impossible to sufficiently enjoy a high quality image due to the enlargement of the color reproduction area, which is one of the most important objects of using the particular color ink. Accordingly, in the present invention, the printing operation is carried without using the particular color ink in the printing mode in which the number of passes is relatively small (the first printing mode).

Since the number of main scans is less in the printing mode in which the number of passes is relatively small, that is, since the printing is completed in a short period, a certain speed is required as the data-generation process speed. This is because, since the printing operation generally starts after the data-generation process has finished when the printing is carried out in a certain area, it is impossible to start the printing operation until the data process has been completed. This process generates a useless waiting time if the data-generation process speed is slow and requires a longer time for the data processing, and the reduction of the number of passes becomes meaningless. When the particular color ink is used, the number of usable colors increases and an amount of data to be processed also increases. Then, a period necessary for generating data is longer to slow the data-generation/processing speed. Accordingly, also in view of the data-generation/processing speed, in the printing mode in which the number of passes is relatively small, it is preferable not to use the particular color ink.

Figure 2A:
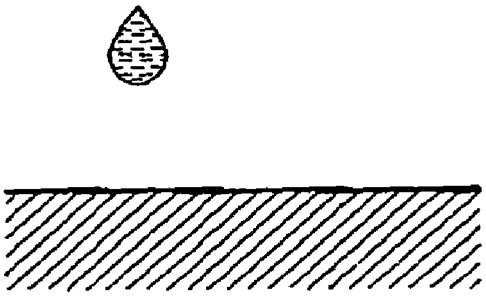
FIGS. 2A to 2E are illustrations for explaining the penetration of ink when the number of main scans (the number of passes) carried out in the same area is large in the multi-pass printing method.
Figure 2B:
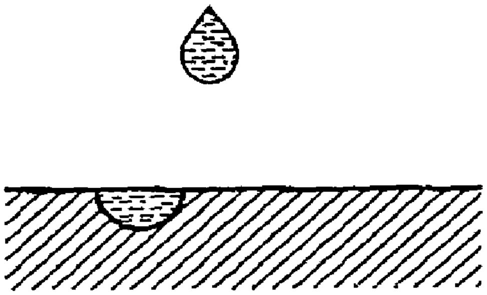
Figure 2C:
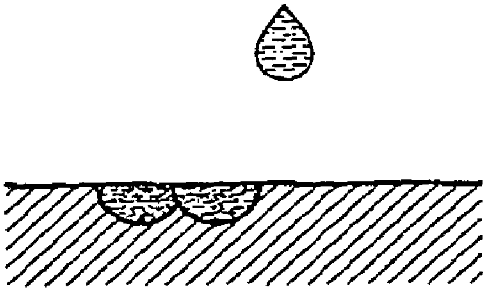
Figure 2D:
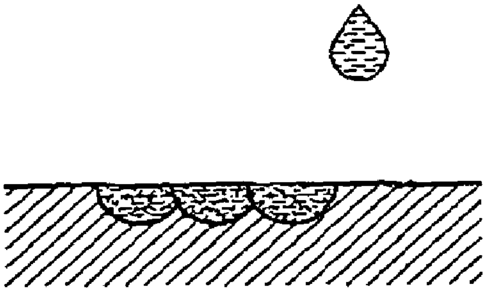
Figure 2E:

On the other hand, in the printing mode in which the number of passes is relatively large, the number of ink droplets ejected to the same area on the printing medium by one main scan at the same time becomes relatively small, and as shown in FIGS. 2A to 2D, the respective ink droplet is sequentially ejected by the respective main scan different from the other to the same area at a time interval. In this regard, since the surface area of the respective ink droplet per unit volume is relatively large, the drying of the ink quickly proceeds and when the next ink droplet is ejected, the preceding ink droplet has already permeated the printing medium at a relatively shallow depth and is fixed. That is, even if the ink droplets of the same amount are imparted to the same area, in comparison with the case shown in FIG. 1B in which a number of ink droplets reach at the same time, the respective ink dots maintain independence from each other as shown in FIG. 2E and the permeation depth thereof is shallower.

Accordingly, since an amount of colorant of the particular color ink left on the printing medium increases when an ink droplet of the particular color ink is included in these ink droplets, it is possible to sufficiently develop the color in the color gamut represented by the particular color ink and sufficiently enjoy a high quality image due to the enlargement of the color reproduction area, which is one of the most important objects of using the particular color ink.

In this regard, if the particular color ink is used as described above, the data-generation/processing speed becomes slower to a certain extent. However, in the mode in which the number of passes is relatively large, since the data processing time becomes shorter in this area than the printing operation time for completing the predetermined printing area, the useless delay of the printing operation is avoidable.

As described above, according to the present invention, the speed-up of the process and achieving a high quality image are compatible with each other by switching the use or non-use of the particular color ink in accordance with the number of passes of the printing head in the same area in the printing medium. More specifically, when the fast data-generation/processing speed is not required and the sufficient color development in the color gamut represented by the particular color ink is desired; that is, in the mode in which the number of passes is relatively large, the color reproduction area is enlarged by using the particular color ink to provide a high quality image. On the other hand, when the fast data-generation/processing speed is required; that is, in the mode in which the number of passes is relatively small, the data processing speed is maintained at a high level by decreasing the number of usable ink colors while using no particular color ink.

In other words, in view of the above studies, the present inventors has employed a system quite different from those derived from the technique disclosed in Japanese Patent Application Laid-open Nos. 5-309874 (1993) and 8-244254 (1996).

(Configuration of the Printing System)

Figure 3:
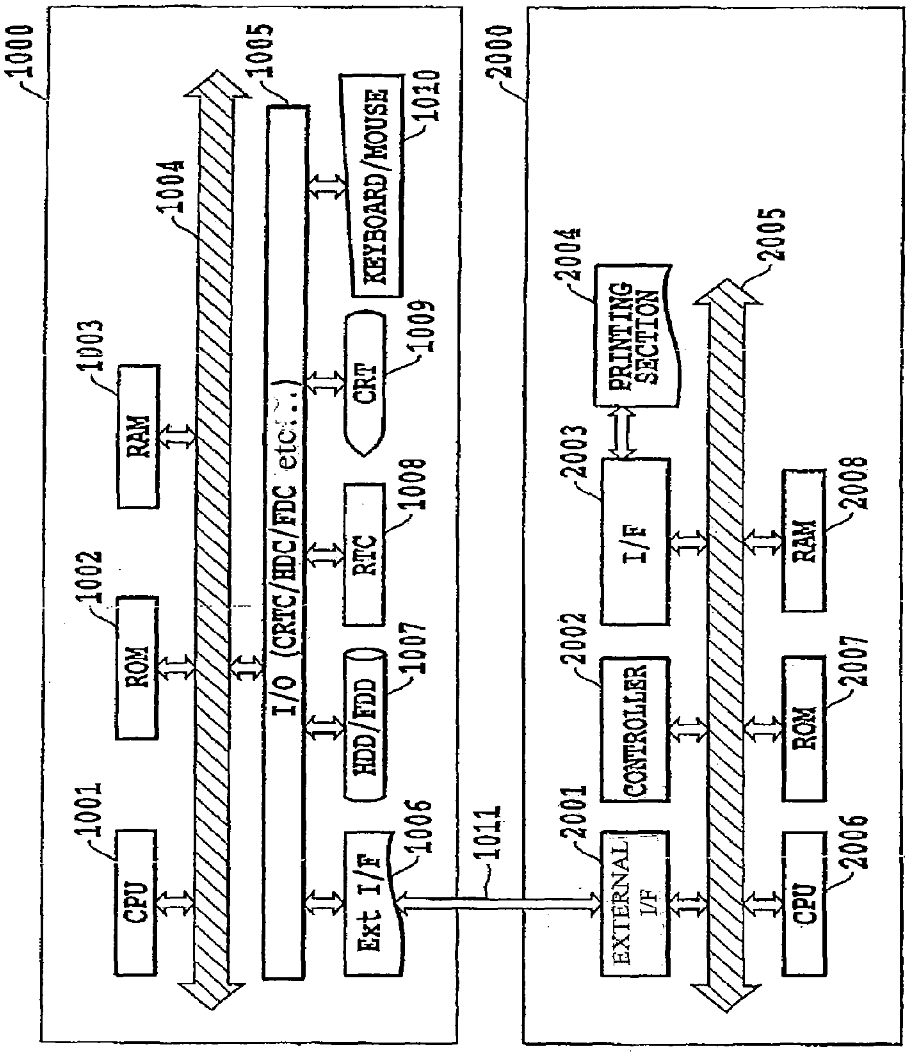
FIG. 3 is a block diagram for illustrating one example of a hardware construction of a printing system according to the present invention.

FIG. 3 is a block diagram showing a hardware configuration of one embodiment of the printing system to which the present invention is applicable. The system according to the present embodiment comprises mainly host apparatus 1000 for generation of image data, a UI (a user interface) for the generation of image data and the like and a printer (a printing apparatus) 2000.

Host apparatus 1000 comprises CPU 1001, ROM 1002, RAM 1003, system bus 1004, I/O controller for the use of various input/output devices (CRTC, HDC, FDC and the like) 1005, external interface (I/F) 1006, external memory devices (HDD/FDD) such as a hard disc drive (HDD) and a floppy (registered trademark) disk drive (FDD), real time clock (RTC) 1008, CRT 1009 and input device (Key Board/Mouse) 1010.

CPU 1001 is operated based on an application program stored by RAM 1003, a communication program, a printer driver, an operating system (OS) and the like read from external memory device 1007. CPU 1001, upon turning on a switch, is booted up by ROM 1002 to load OS in RAM 108 from external memory device 1007 and the like. Then, the application program, the driver software and others are loaded in a similar manner to establish functions of a system. External interface 1006 sends printing data spooled in RAM 1003 or external memory device (ADD) 1007 sequentially to printer 2000 via cable 1011. Input device 1010 receives instruction data from a user into a host computer via the I/O controller. RTC 1008 is a means for clocking a system clock, which obtains and/or sets time information via I/O controller 1005. CRT 1009 is a display device which is controlled by CRTC in I/O controller 1005. Blocks of CRT 1009 and input device 1010 constitutes user interface.

Printer 2000 comprises CPU 2006 for executing printing steps described later, ROM 2007 for storing the printing steps, RAM 2008, controller 2002, interface (I/O) 2003 for printing section 2004 including a printing head, external interface (I/F) 1006 and system bus 1004

Figure 4:
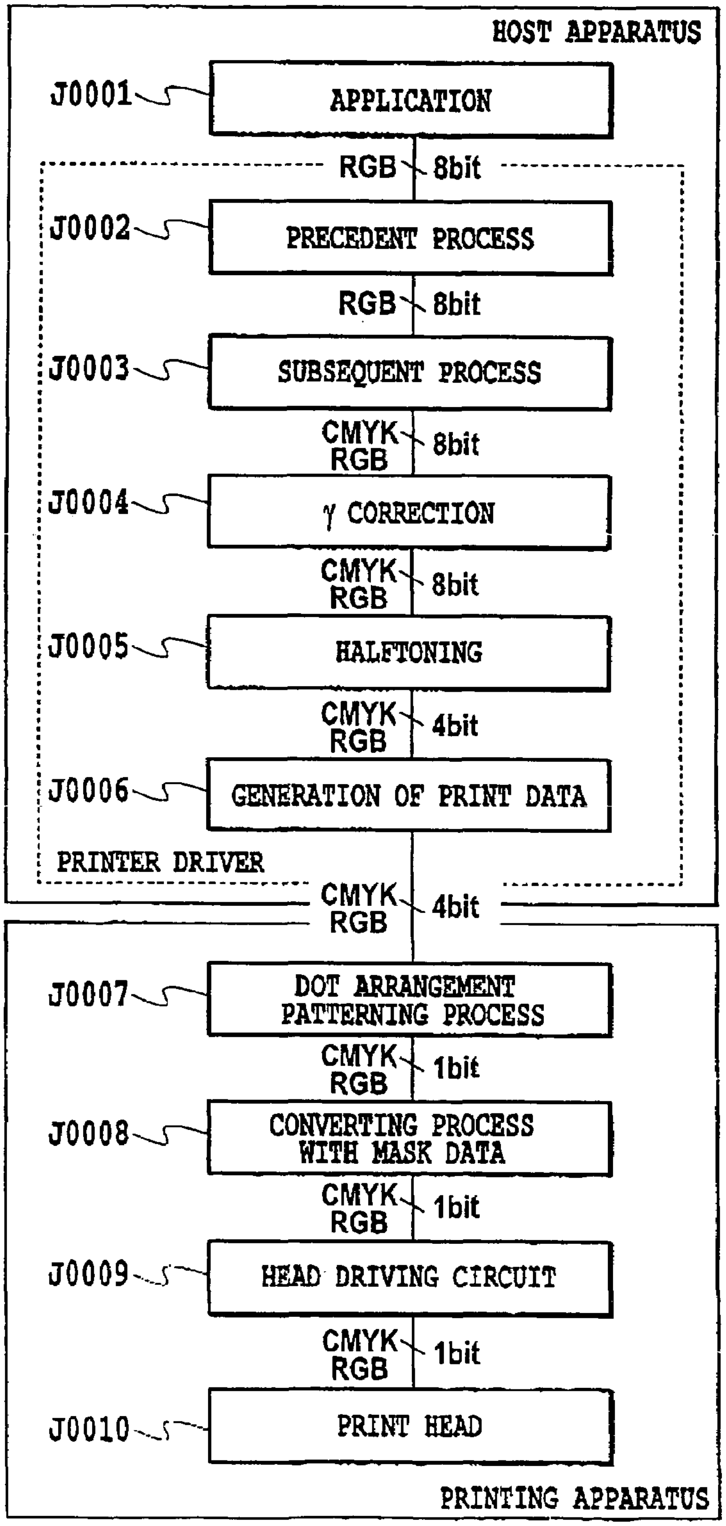
FIG. 4 is a functional block diagram for illustrating the example of the printing system according to the present invention along a flow of image data.

FIG. 4 is a block diagram showing an example of a print system, to which the present invention is applicable, along with a flow of an image data. A print apparatus according to the present embodiment performs printing by using seven color inks, i.e. cyan, magenta, yellow, red, green, blue and black. Therefore, the print apparatus uses a printing head for ejecting the seven color inks.

There are applications and printer drivers as programs which are operative by operating systems of host apparatus 1000. Application J0001 executes a process for forming an image data to be printed by a printer. The image data or data prior to being edited can be downloaded to a PC via various media. The PC according to the present embodiment can download an image data from a digital camera, e.g. an image data of a JPEG type, via a CF card. The PC can also download an image data scanned from a scanner, e.g. an image data of a TIFF type, and an image data that has been stored in a CD-ROM. The PC can further download data on a web site through the internet. Each downloaded data is displayed on a monitor, followed by data-organization, editing thereof and the like via application J0001, resulting, for example, in a formation of image data R, G, B of a sRGB standard. Then, the image data is sent to the printer driver in accordance with a printing instruction.

The printer driver according to the present embodiment includes processes of precedent process J0002, subsequent process J0005, γ correction process J0004, halftonning process J0005, and print data creation process J0006. Precedent process J0002 performs mapping of a gamut. Precedent process J0002 according to the present embodiment performs data conversion of an 8-bit image data R, G, B into data R, G, B in the gamut of the printer. The data conversion uses three dimensional LUT including a relation to map the gamut reproduced by the image data R, G, B of the sRGB standard to the gamut reproduced by printer 2000 of the present print system, simultaneously using an interpolating operation. Subsequent process J0003, based on the data R, G, B to which mapping of the gamut has been made as stated above, performs a processing to obtain a combination of inks which may reproduce the color represented by the mapped data, i.e. a color separation data Y, M, C, K, R, G and B corresponding respectively to yellow, magenta, cyan, black, red, green and blue. According to the present embodiment, this process is performed, in a similar manner as the precedent process, by a combination of the three dimensional LUT and the interpolating operation. γ correction process J0004 performs a tone value conversion of data of each color of the color separation data detected by subsequent process J0003. More specifically, by using a one dimensional LUT in accordance with a tone property of each ink of the printer employed with the present system, a conversion is performed such that the above color separation data linearly corresponds to the tone property of the printer. Halftonning process J0005 carries out quantization in which each of the 8-bit color separation data Y, M, C, K, R, G and B is converted to 4-bit data. The present embodiment employs an error diffusion method for converting the 8-bit data into 4-bit data. This 4-bit data serves as an index for showing an arrangement pattern in patterning process of dot arrangement in the printing apparatus. Finally, print data creating process J0006 creates print data in which print control information is added to a print image data including the above 4-bit index data. Processes for the above application and printer driver are performed by the CPU in accordance with their programs. At the time, the program is read out from a ROM or a hard disk to be applied. Upon execution of the processes, a RAM is used as a working area.

The printing apparatus performs dot arrangement patterning process J0007 and mask data conversion process J0008 with regard to data processing. Dot arrangement patterning process J0007 arranges dots in accordance with a dot arrangement pattern corresponding to 4-bit index data (tone value information), that is a print image data, for each pixel corresponding to an actual print image. Each pixel represented by the 4-bit data is assigned a dot arrangement pattern corresponding to a tone value of the pixel. As a result, each of a plurality of areas within the pixel is defined with a on/off state, and an ejection data of "1" or "0" will be assigned to each area in one pixel. Thus, obtained 1-bit ejection data will be provided with masking by mask data conversion process J0008. In other words, ejection data of each scan for completing printing of a scanning area of a predetermined width by a printing head with a plurality of scans is generated by the process using masks respectively corresponding to each scan. Each ejection data Y, M, C, K, R, G and B of each scan is sent to head driving circuit J0009 at an appropriate timing, thereby driving the printing head J0010 to eject each ink in accordance with the ejection data. Here, the above stated dot arrangement patterning process and mask data conversion process in the printing head J0010 are executed, using a hardware circuit proprietary thereto, under control of a CPU constituting a controlling section of the printing apparatus. These processes may be performed by a CPU following the application program. The above processes may be carried out by, for example, the printer driver of the PC. Upon an application of the present invention, as it is apparent from an explanation below, the processing mode should not be construed as being limited to the modes as set forth herein.

The printer of the present embodiment as set forth above employs inks of red, green and blue as particular colors. Here, the particular color refers to a hue of color that is different from the basic color inks such as the three colors of yellow, magenta and cyan, more specifically, a color representing a hue angle between two colors among three colors. In the present embodiment, further specifically, the particular color refers to color that can realize high chroma and lightness higher than the colors having the same hue in secondary colors made by the mixture. In other words, "particular color" of the present embodiment refers to, in CIE-L*a*b* color space, the hue angle within a color reproduction area expressed by a combination of any two printing agents among basic color printing agents of magenta, yellow and cyan. The "particular color" of the present embodiment further refers to the color of high chroma and lightness higher than the color of the color reproduction gamut expressed on the printing medium by the combination of two printing agents.

Also, especially the particular color ink of red according to the present embodiment is possible to reproduce the high chroma and lightness higher than the color in the color space in which the image data R, G, B of sRGB standard of monitors or the like can be reproduced.

In the present description, the inks as the printing agents are respectively referred to as Cyan, Magenta, Yellow and Black, and the colors or data and hues of the inks are represented by capital letters thereof such as C, M, Y and K. That is, C represents cyan color, its data or its hue; M represents magenta color, its data or its hue; Y represents yellow color, its data or its hue; K represents black color, its data or its hue; R represents red color, its data or its hue; G represents green color, its data or its hue; and B represents blue color, its data or its hue, respectively.

Furthermore, in the present description, "pixel" refers to a minimum unit that can express tone or gradation. The minimum unit also can be subjected to an image data processing (the above stated processes such as precedent process, subsequent process, γ correction process, halftonning process) for multi-value data of a plurality of bits. As it will be explained below, in the halftonning process, one pixel corresponds to a pattern formed with m×n (for example, 4×2) squares. Each square within one pixel is defined as an area. This "area" is a minimum unit in which a on/off state of dots is defined. In conjunction therewith, the "image data" as referred in the above stated precedent process, subsequent process and γ correction process represents a group of pixels to be processed. Each pixel of the present embodiment is data including a content of 8-bit tone value. "Pixel data" in the halftonning process represents a pixel data itself which is to be processed. In the halftonning process according to the present embodiment, a pixel data including a content of the above stated 8-bit tone value is converted into pixel data including a content of 4-bit tone value (an index data).

(General Construction of Mechanism of Image Forming Device)

General construction of the mechanism of the ink jet printing apparatus used as the image forming apparatus in the present embodiment will be explained below. A body of the printing apparatus according to the present embodiment comprises a paper feeding section, a paper feeding section, a carriage section, a paper discharge section, a cleaning section and an outer covering section for protecting the aforementioned sections and giving design to the apparatus, each section being named after a function thereof. Outlines of those sections will be explained below.

Figure 5:
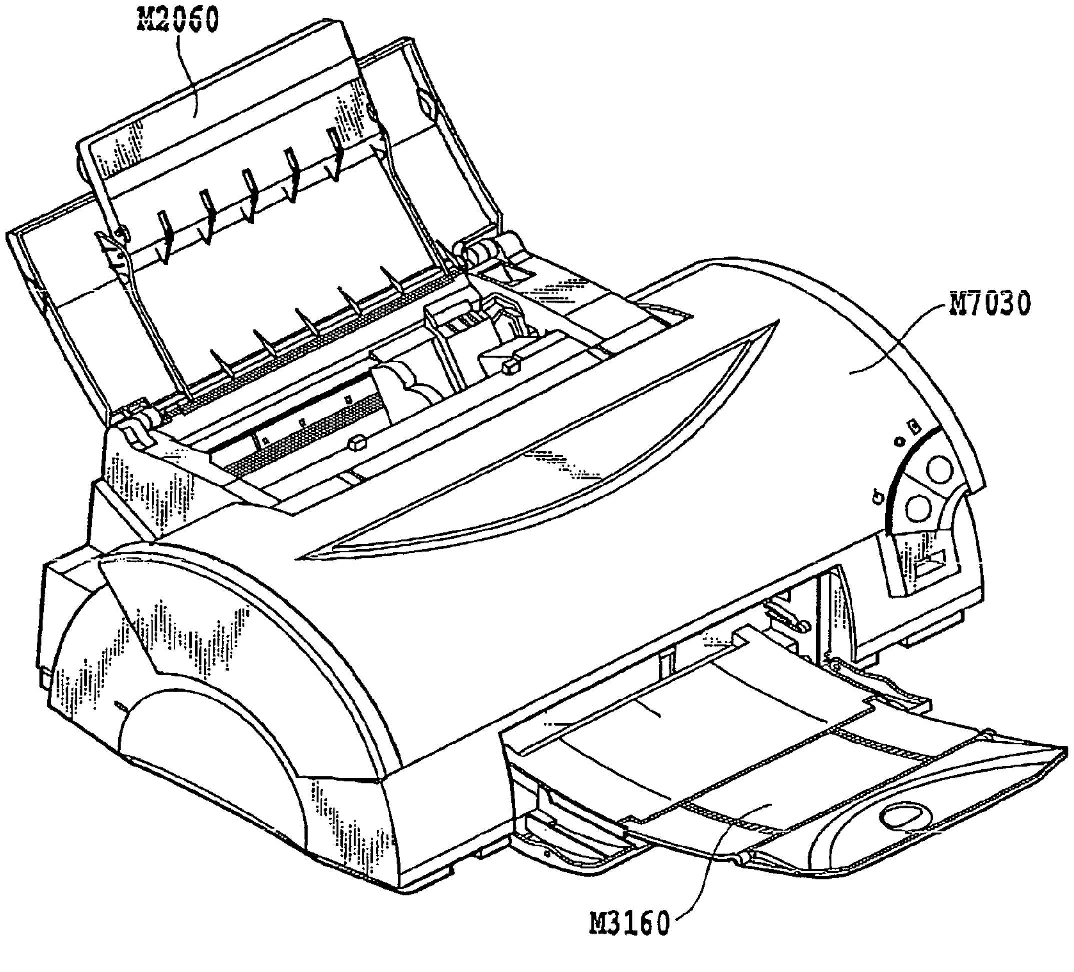
FIG. 5 is a perspective view of a printing apparatus according to one embodiment of the present invention.
Figure 6:
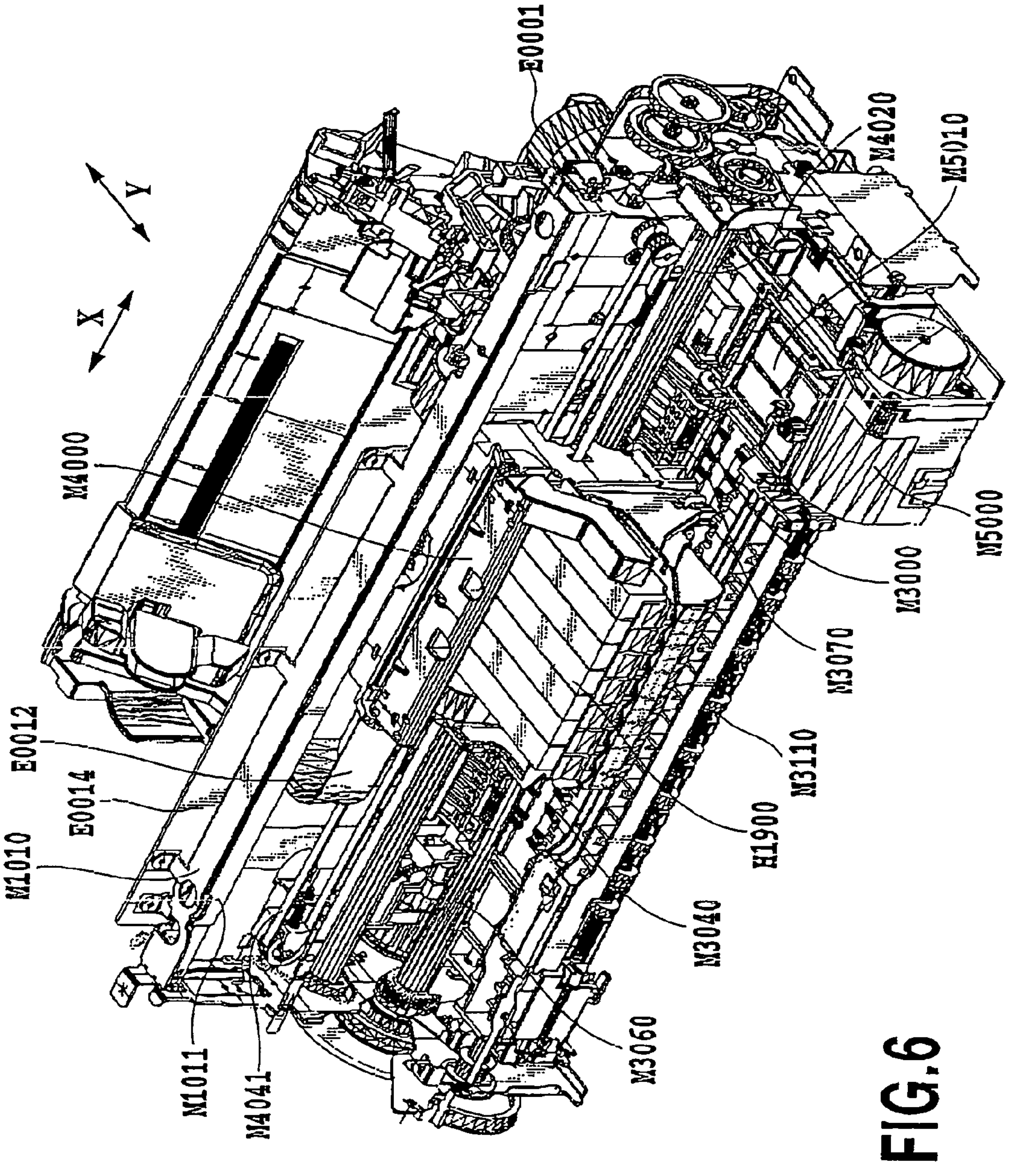
FIG. 6 is a perspective view of a mechanical part of the printing apparatus according to the embodiment of the present invention.
Figure 7:
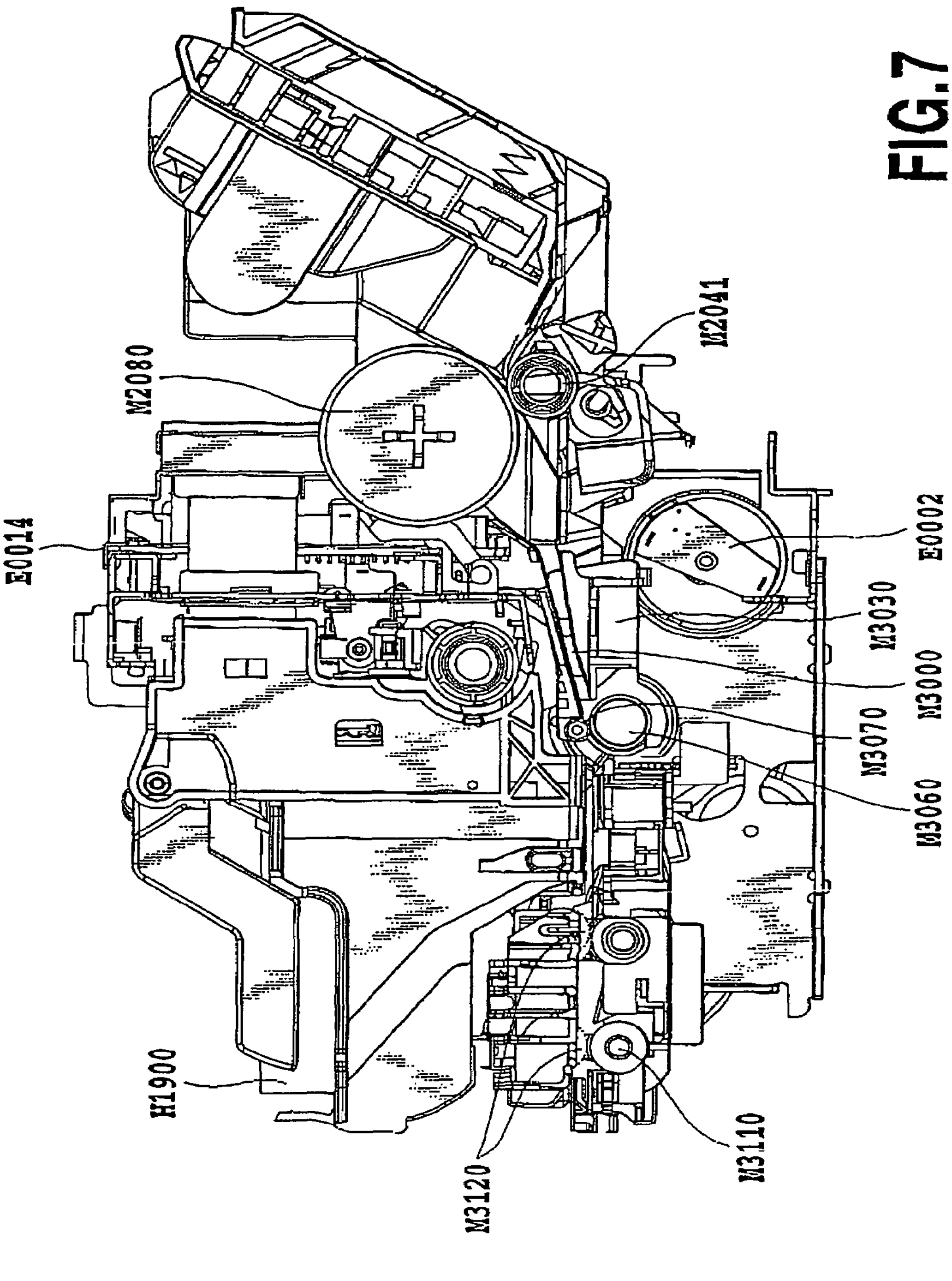
FIG. 7 is a sectional view of the printing apparatus according to the embodiment of the present invention.

FIG. 5 shows a perspective view of the printing apparatus applicable to the present embodiment. FIGS. 6 and 7 are views for explaining the inner mechanism of the body of the printing apparatus. FIG. 6 illustrates a perspective view as viewed from the upper right and FIG. 7 illustrates a side sectional view of the body of the printing apparatus, respectively.

Upon feeding a printing medium in the printing apparatus applicable to the present embodiment, only a predetermined number of the printing media are fed to a nip portion composed of paper feeding roller M2080 and paper separating roller M2041 in the paper feeding section including a paper feeding tray M2060. The printing media having been delivered are separated at the nip portion and only the uppermost printing medium is delivered to the paper feeding section. The printing medium to be delivered to the paper feeding section is guided by pinch roller holder M3000 and paper guide flapper M3030, resulting in the medium being sent to a pair of rollers consisting of feeding roller M3060 and pinch roller M3070. A pair of rollers consisting of feeding roller M3060 and pinch roller M3070 rotates by the driving of LF motor E0002. Rotations of the rollers cause the printing medium to be fed on platen M3040.

The carriage section has carriage M4000 on which printing head H1001 is mounted Carriage M4000 is supported by guide shaft M4020 and guide rail M1011. Guide shaft M4020 is attached to chassis M1010 in order to guide and support carriage M4000 to have the carriage scan reciprocately in a right-angle direction with regard to a feeding direction of the printing medium. Also, carriage M4000 is driven by carriage motor E0001 disposed on chassis M1010 via timing belt M4041. Further, carriage M4000 is connected to flexible cable E0012 for conveying driving signals from electric board E0014 to printing head H1001. With such a construction, when an image is formed on the printing medium, a pair of rollers consisting of feeding roller M3060 and pinch roller M3070 feed the printing medium to position it with regard to the feeding direction (a column direction). Furthermore, with regard to a scanning direction (a raster direction), carriage motor E0001 causes carriage M4000 to move in a direction perpendicular to the above stated feeding direction to place printing head H1001 (FIG. 8) at a targeted image forming position. The positioned printing head H1001, in accordance with the signals from electric board E0014, ejects ink onto the printing medium. A detailed configuration of printing head H1001 will be explained later. The printing apparatus according to the present embodiment has a construction to form an image on the printing medium by carrying out a main scan in which carriage M4000 scans while printing head H1001 performs printing and a sub-scan in which feeding roller M3060 feeds the printing medium, the main scan and the sub-scan being performed repeatedly.

The printing medium onto which the image formation has been finalized will be sandwiched at a nip portion between a first discharge roller M3110 and spur M3120 and then fed to discharge tray M3160 to be discharged.

In the cleaning section, if pump M5000 is activated in a state where cap M5010 is closely contacted to an ink ejection port for the purpose of cleaning of printing head H1001 prior to and/or after the image printing, useless ink and the like is suctioned from printing head H1001. Further, the printing head is configured to prevent anchoring of the remaining ink and an adverse effect that may occur by suctioning ink remaining at cap M5010 when cap M5010 is open.

(Configuration of Recording Head)

A configuration of head cartridge H1000 applicable to the present embodiment will be explained hereinafter.

Head cartridge H1000 according to the present embodiment comprises printing head H1001, means for mounting ink tank H1900, means for supplying ink from ink tank H1900 to the printing head, wherein the head cartridge is mounted to carriage M4000 in a detachable manner.

Figure 8:
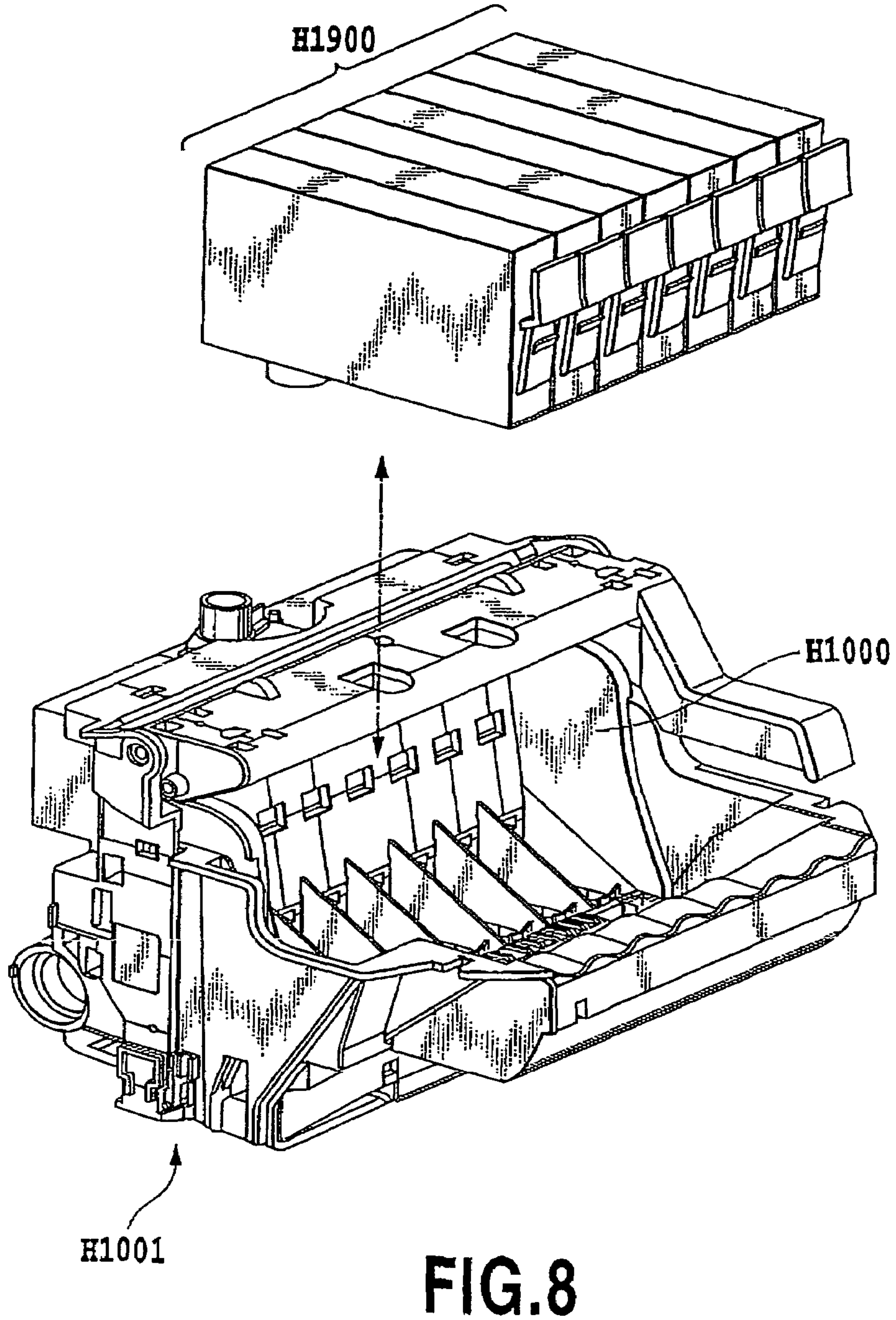
FIG. 8 is a perspective view of a head cartridge applied to the embodiment of the present invention, when an ink tank is mounted thereto.

FIG. 8 illustrates how to mount ink tank H1900 onto head cartridge H1000 applicable to the present embodiment. The printing apparatus of the present embodiment forms an image using seven color inks such as cyan, magenta, yellow, black, red, green and blue. Therefore, seven independent ink tanks H1900 for each of the colors are prepared. As shown in the figure, each ink tank is detachable with regard to head cartridge H1000. Detachment of each ink tank H1900 can be performed in a state where head cartridge H1000 is mounted on carriage M4000.

Figure 9:
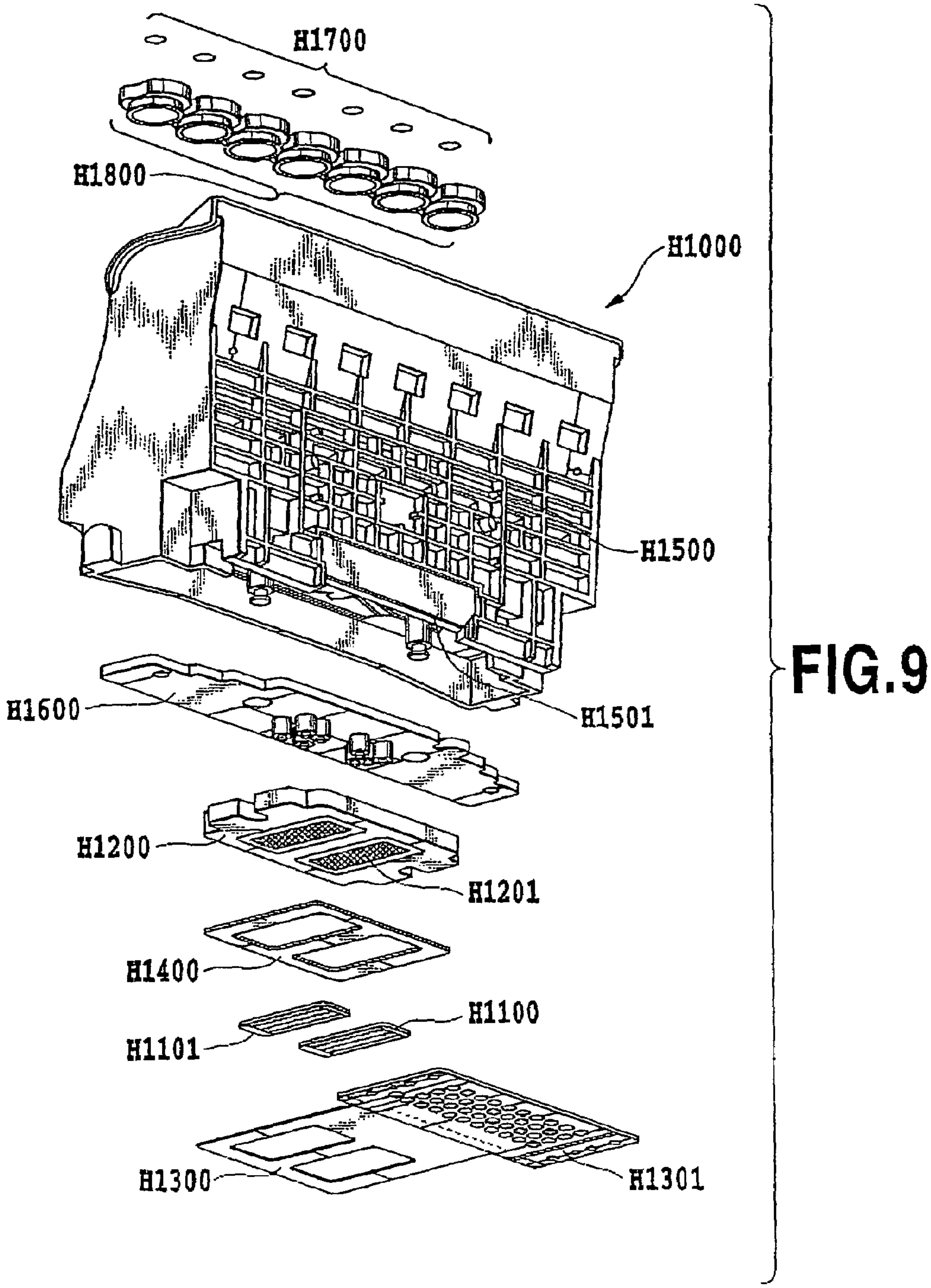
FIG. 9 is an exploded perspective view of the head cartridge applied to the embodiment of the present invention.

FIG. 9 shows an exploded perspective view of head cartridge H1000. In the figure, head cartridge H1000 comprises first printing element board H1100, second printing element board H1101, first plate H1200, second plate H1400, electric circuit board H1300, tank holder H1500, flow path forming member H1600, filters H1700, sealing rubbers H1800 and the like.

First printing element board H1100 and second printing element board H1101 are Si boards, of which one side of each board is formed by photolithograpy with a plurality of printing elements (nozzles) for ejecting inks. Electric wiring for supplying electricity to each of the printing elements, such as Al, is formed by film forming techniques. A plurality of ink flow paths each corresponding to each of the printing element is also formed by photolithography. Ink supply ports for supplying inks to a plurality of ink paths are formed such that the ports open to rear faces of the printing element boards.

Figure 10:
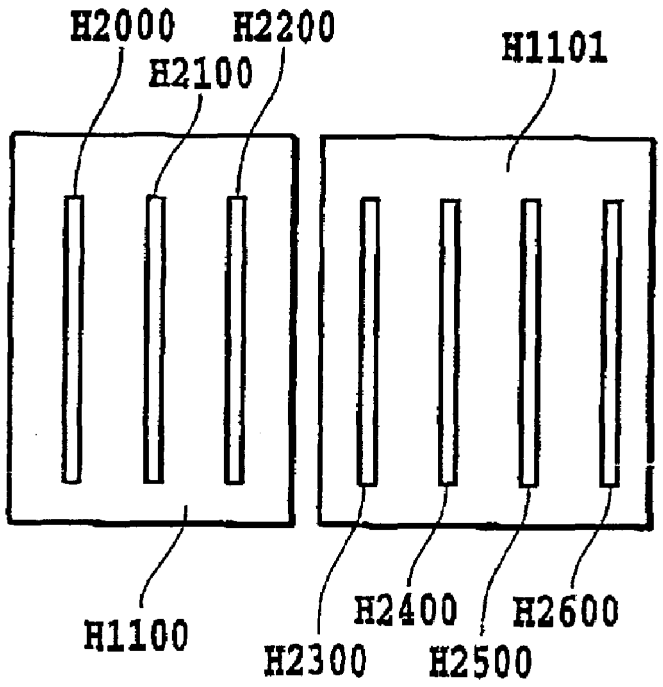
FIG. 10 is a front view of a printing element substrate in the head cartridge applied to the embodiment of the present invention.

FIG. 10 is an enlarged view as viewed from a front of the first and second printing element boards H1100 and H1101 for explaining a configuration of the printing element boards. H2000-H2600 are arrays of printing elements (hereinafter, referred also to as nozzle arrays), each of printing elements corresponding to each of the different ink colors. First printing element board H1100 is formed with nozzle arrays for three colors, i.e. nozzle array H2000 to be supplied with cyan ink, nozzle array H2100 to be supplied with magenta ink and nozzle array H2200 to be supplied with yellow ink. Second printing element board H1101 is formed with nozzle arrays for four colors, i.e. nozzle array H2300 to be supplied with black ink, nozzle array H2400 to be supplied with red ink, nozzle array H2500 to be supplied with green ink and nozzle array H2600 to be supplied with blue ink.

Each nozzle array has 768 nozzles aligning at interval of 1200 dpi (dot/inch) in the feeding direction of the printing medium, to eject ink droplets in an amount of about 2 picoliters. An opening area of each nozzle ejection port has been set to approximately 100 $\mu m^2$. Also, fist and second printing element boards H1100 and H1101 are bonded securely together with plate H1200, where ink supply ports H1201 are formed for supplying ink to the first and second printing element boards H1100 and H1101.

Further, first plate H1200 is bonded securely together with second plate H1400, the second plate having openings. Second plate H1400 retains electric circuit board H1300 such that an electric connection is established between electric circuit board H1300 and first and second printing element boards H-1100 and H1101.

Electric circuit board H1300 applies electric signals to cause ink to be ejected from each of the nozzles formed on first and second printing element board H1100 and H1101. Electric circuit board H1300 includes electric wiring corresponding to first and second printing element board H1100 and H1101 and external signal input terminal H1301, being positioned at an end of the electric wiring, for receiving electric signals from the body of the printing apparatus. External signal input terminal H1301 is positioned on the rear face side of tank holder H1500 and secured thereat.

Flow path forming member H1600 is secured, for example by ultrasonic welding, to tank holder H1500 for holding ink tank H1900, resulting in a formation of ink flow path H1501 from ink tank H1900 to first plate H1200.

Filters H1700 are mounted at an end of ink tank side of ink flow path H1501 which engages with ink tank H1900, so that an invasion of dust from the outside can be prevented. Further, engagement sections with ink tanks H1900 are provided with sealing rubbers H1800, so that ink vaporization through the engagement sections can be prevented.

Head cartridge H1000 is configured by combining, for example by means of bonding or the like, the tank holder section comprising tank holder U1500, flow path forming member H1600, filters H1700 and sealing rubbers H1800 with printing head section H1001 comprising first-printing element board H1100, second printing element board H1101, first plate 1H1200, electric wiring board H1400 and second plate H1400.

An ink ejection method of the printing head includes, as an example, a method employing an electrothermal transducer (printing element) for generating thermal energy which causes film boiling of ink in response to electric signals in order to eject ink. This method is applicable to both of the so-called on-demand type printing heads and continuous type printing heads. Specifically, for the on-demand type printing heads, at least one driving signal, which corresponds to printing information and induces sudden temperature rise that exceeds the nucleate boiling, is applied to the electrothermal transducer placed in association with a sheet or liquid flow path where liquid (ink) is retained. Accordingly, thermal energy is generated by the electrothermal transducer to cause film boiling on a heat effecting surface of the printing head. As such, the electrothermal transducer generates thermal energy to cause film boiling on the heat effecting surface of the printing head which results in bubbles within the liquid (ink) corresponding one-to-one to each of the driving signals being formed effectively. According to growth and/or shrinkage of the bubbles, liquid (ink) is ejected through the ejection ports to form at least one droplet. If this driving signal is a pulse type, the growth and/or the shrinkage of the bubbles can be done immediately and suitably. That is, liquid (ink) ejection, especially of excellent response, can be achieved and thus is more preferable.

Furthermore, as other ejection type printing heads, there may be on-demand type ink jet printing head comprising a nozzle forming board having a plurality of nozzles thereon, pressure generation elements composed of piezoelectric members and conductive members which are placed opposing the nozzles and ink filling the circumferences of the pressure generation elements, wherein the pressure generation elements are deformed by an application of an electric vltage and small ink droplets are ejected from the nozzles.

The ink jet printing apparatus is not limited to the apparatus in which the head and the ink tank are mounted separately, but can be an apparatus in which the head and the ink tank are integral with each other. Also, the ink tank may be mounted on the carriage either separately or integrally with regard to the printing head. The ink tank also may be disposed on a securing section of the ink jet printing apparatus to supply ink to the printing head via an ink supply member, e.g. tube. When the ink tank is provided with a construction for exerting desired negative pressure to the printing head, a construction in which a suction body is placed in an ink retaining section of the ink tank or a construction having a flexible ink retaining bag and a spring section which generates an urging force in a direction a capacity of the bag expands can be employed.

First Embodiment

In using the constitution of the apparatus capable of printing with seven colors of inks as stated above, quality information is selectable from two kinds of options such as "standard" and "fine". If "standard" is selected, a 4-pass printing mode using four colors (yellow, magenta, cyan and black) is executed in which particular colors (red, green and blue) are not used. This is the first printing mode. Also, if "fine" is selected as the quality information, a 8-pass printing mode using seven colors including particular colors is executed. This is the second printing mode. According to the present embodiment, the printing mode is selected by users as a selection of the quality information. "Information corresponding to the number of main scans" as recited in claims refers to quality information corresponding to the number of main scans. More specifically, in the present embodiment, quality information, the number of passes and use or non-use of particular colors or usable ink colors are related in such a manner as indicated by Table 1 below.

TABLE 1

| Quality Information | Standard | Fine |
|---|---|---|
| Number of Passes | 4-pass | 8-pass |
| Particular Colors | Non-use | Use |
| Usable Colors | Four Colors such as Cyan, Magenta, Yellow, Black | Seven Colors such as Cyan, Magenta, Yellow, Black, Red, Green, Blue |

Figure 11:
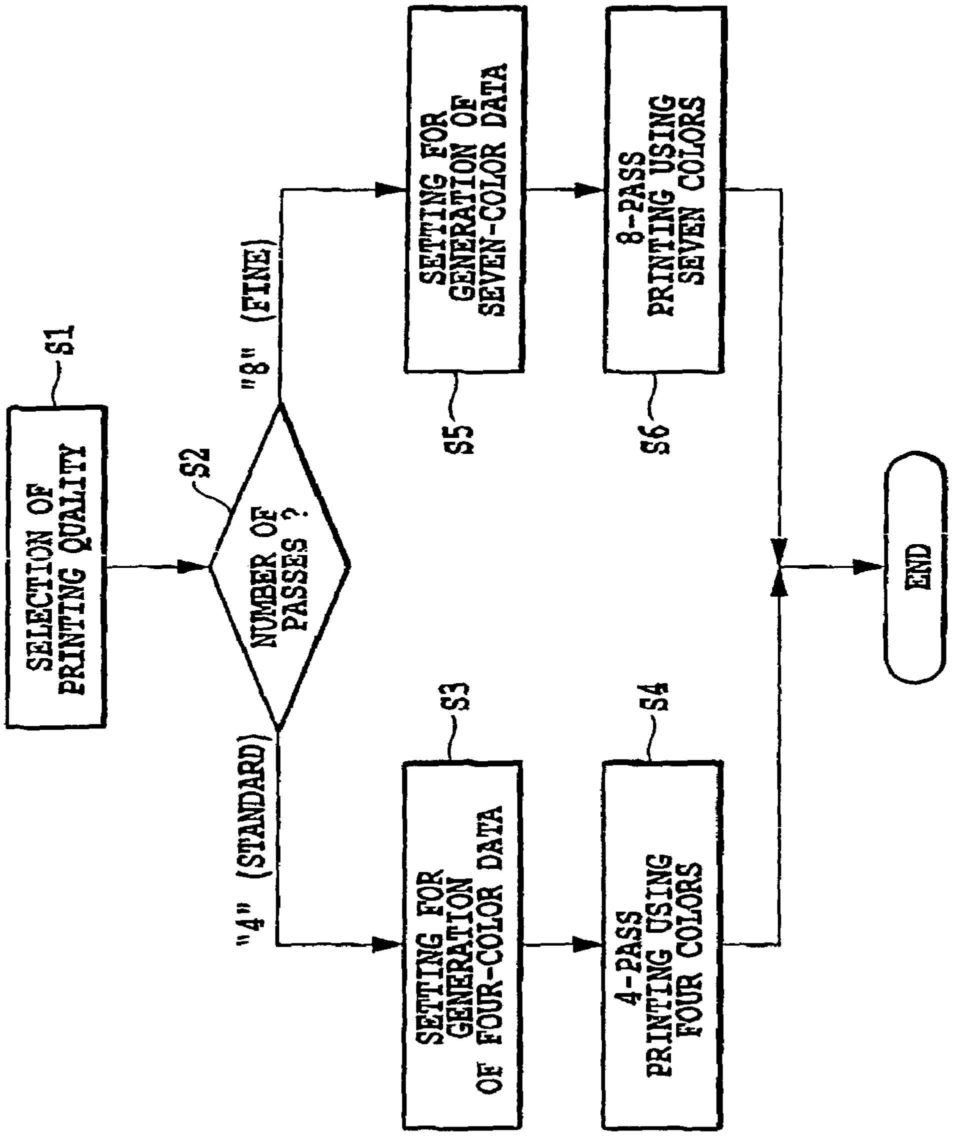
FIG. 11 is a flow chart illustrating the printing steps in a first embodiment of the present invention.

FIG. 11 is a flow chart representing printing procedure according to the present embodiment.

Firstly, in step S1, one quality information is selected among a plurality of quality information corresponding to the number of main scans as indicated in the above Table 1, in a property screen of the printer driver activated in response to the printing instruction, for example, from an application program. Accordingly, the printer driver obtains information as to the number of main scans.

Figure 12:
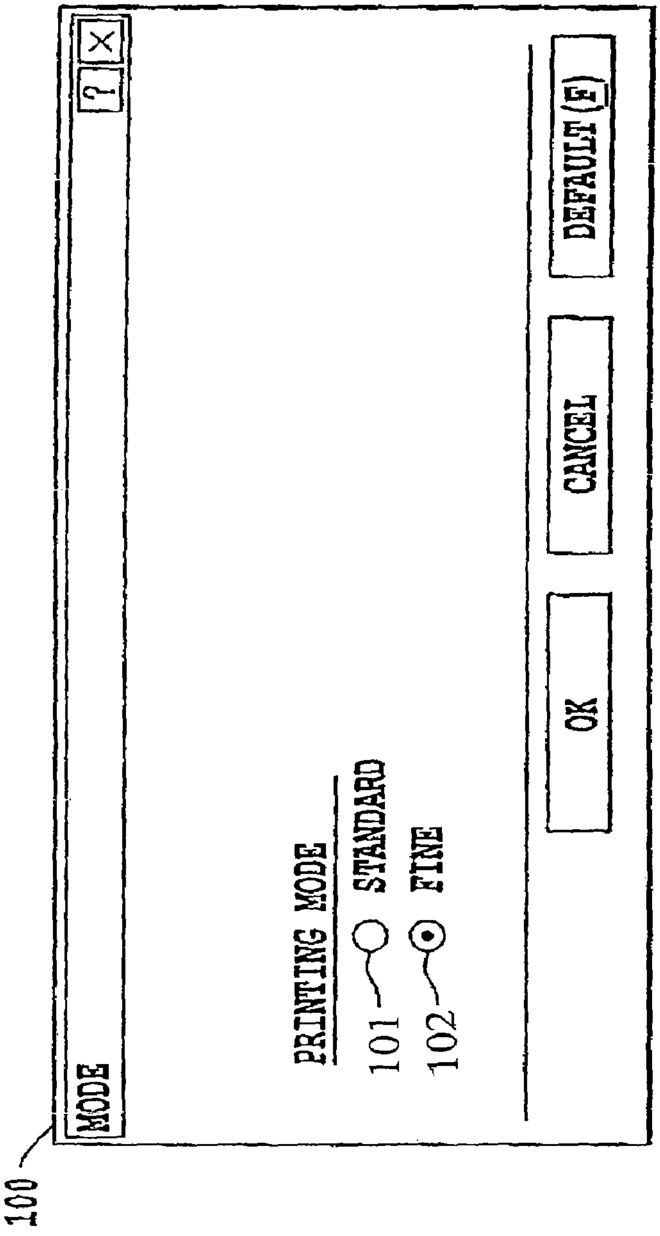
FIG. 12 is an illustration of one example of a property screen of a printer driver used in the first embodiment of the present invention.

FIG. 12 is an example of display of property screen 100 for selecting the quality information. As to the quality information that can be set by the present embodiment, there exists two options such as "standard" and "fine". Radio buttons 101 and 102 are assigned respectively to each of the functions to conduct an exclusive access control in such a manner one of these two buttons is selected.

If "standard" is selected as the quality information information to the effect that 4-pass four-color printing mode without using particular colors (the first printing mode) is to be executed is obtained. Further, if "fine" is selected as the quality information, information to the effect that 8-pass seven-color printing mode using particular colors (the second printing mode) is to be executed is obtained.

After the selection of quality information as mentioned above is completed and execution of printing is instructed, based on thus obtained information corresponding to the number of main scans (quality information), bifurcation determination is made such that data of the ink color to be generated is determined to perform printing by step S2. More specifically, if the number of main scans corresponding to the information obtained by step S1 is the first number of scans (here, 4 times), the procedure goes forward to step S3 wherein four-color data without using particular colors is decided to be generated. On the other hand, if the number of main scans corresponding to the information obtained by step S1 is the second number of scans (here, 8 times) that is more than the first number of times, the procedure goes forward to step S5 to decide generation of seven-color data using particular colors. In other words, if the quality information obtained by step S1 is "standard", the procedure goes forward to step S3, while if the quality information obtained by step S1 is "fine", the procedure goes forward to step S5.

In step S3, since the number of main scans is equal to the first number of times (here, 4 times), namely since the number of main scans is relatively small, data generation is performed in such a manner that particular colors such as red, green and blue are not used, but cyan, magenta, yellow and black inks are used. More specifically, in the subsequent process J0003 as shown in FIG. 4, multi-value data of RGB is converted into multi-value data corresponding to four colors such as C, M, Y and K. Hence, data (CMYK data) corresponding to colors of inks usable in the first printing mode wherein the number of passes is relatively small is generated. Thereafter, γ correction process J0004, halftonning process J0005 and the like are performed. Then, binary data corresponding to four colors C, M, Y and K is generated. The procedure, then, goes forward to step S4.

Figure 13:
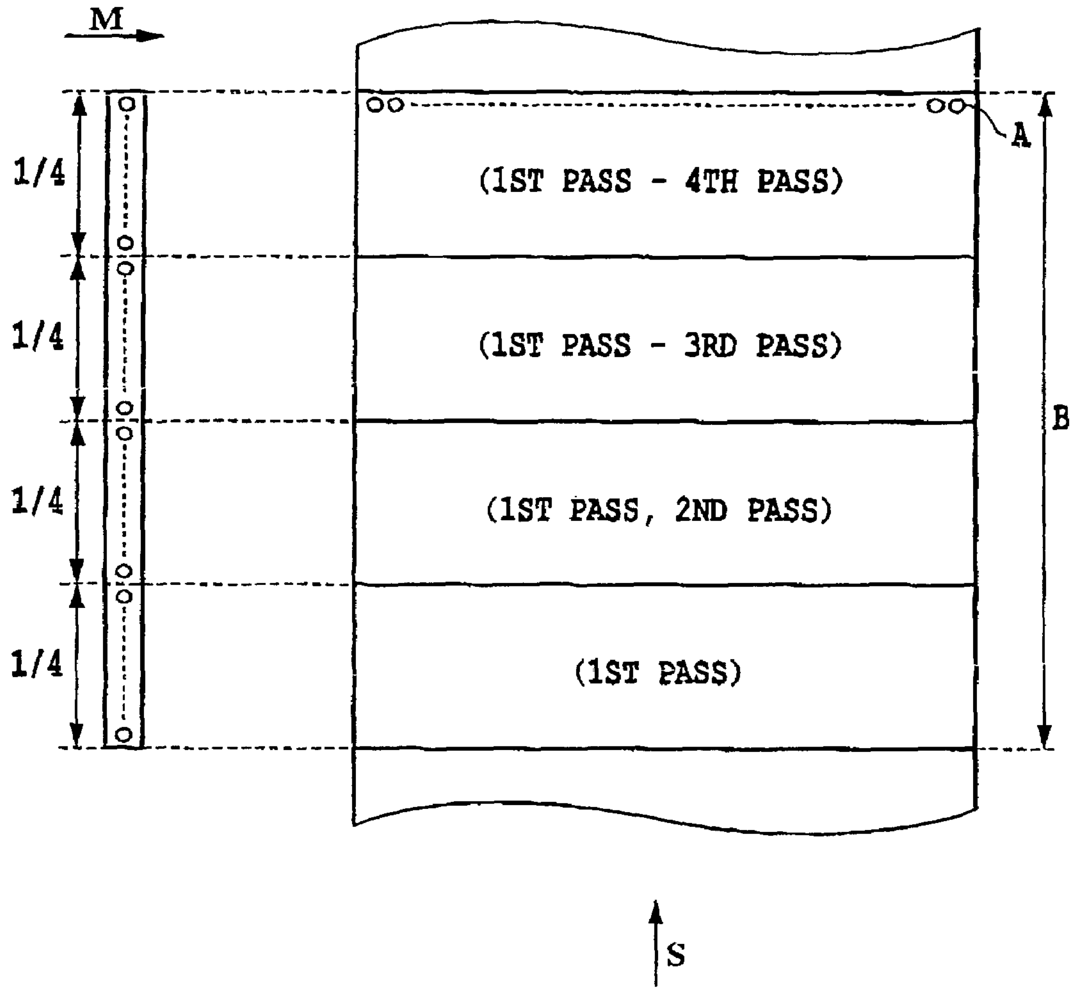
FIG. 13 is an illustration when the print is carried out by repeating the main scan of the printing head in the same area in the printing medium a relatively small number of times when the multi-pass printing method is adopted.

In step S4, based on the binary data corresponding to four colors C, M, Y and K, the printing head performs main scan for the first number of times (4 times) with regard to the same area of the printing medium to complete printing onto the printing medium as shown in FIG. 13.

In step S5, since the number of main scans is equal to the second number of times (here, 8 times) which is larger than the first number of times, namely since the number of main scans is relatively large, data is generated such that particular color inks such as red, green and blue are used in addition to cyan, magenta, yellow and black inks. More specifically, in subsequent process J0003 as shown in FIG. 4, multi-value data of RGB is converted into multi-value data corresponding to seven colors such as C, M, Y, K, R, G and B. Hence, data (CMYKRGB data) corresponding to the colors of inks usable by the second, printing mode in which the number of passes is relatively large is generated. Thereafter, the procedure goes forward to step S6.

Figure 14:
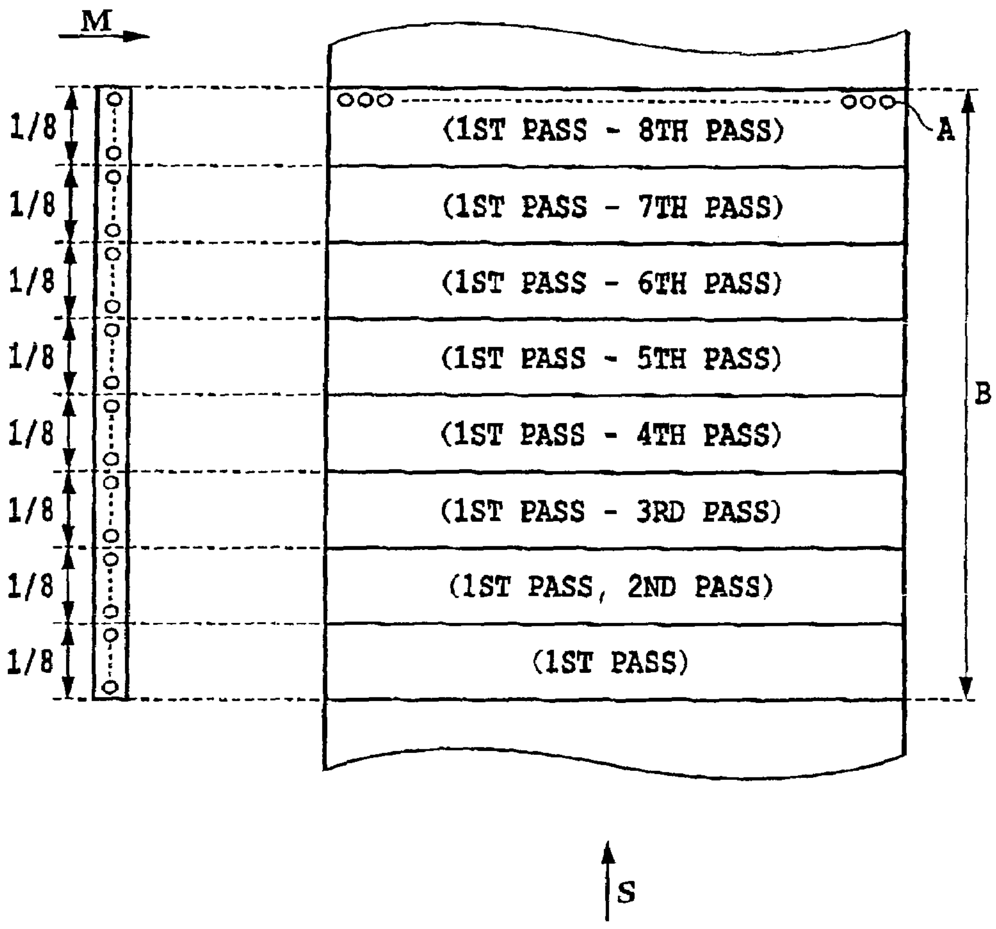
FIG. 14 is an illustration when the print is carried out by repeating the main scan of the printing head in the same area in the printing medium a relatively large number of times when the multi-pass printing method is adopted.

In step S6, based on the binary data corresponding to seven colors such as C, M, Y, K, R, G and B, the printing head performs main scans for the second number of times (8 times) that is larger than the first number of times with regard to the same area of the printing medium as shown in FIG. 14.

In the examples of FIGS. 13 and 14, the printing head scans in the direction M (raster direction) different from an arrangement direction in which the plurality of the ink ejection ports are arranged. The printing medium is fed by an amount less than the arrangement width of the plurality of ink ejection ports (¼ of the arrangement width in FIG. 13; and ⅛ of the arrangement width in FIG. 14) between main scans relatively in the sub-scanning direction S which crosses the main scanning direction, so that the image formation is performed, by so-called multi-pass printing method, onto the printing medium by the plurality of numbers of main scans which carries out the printing in accordance with the dot arrangement in a complementary relation with regard to the same printing area (4 times from the first pass to the fourth pass in FIG. 13; and 8 times from the first-pass to the eighth-pass in FIG. 14). In such printing method, the image to be printed with one main scan is thinned properly and a thus the entire image data is formed with a plurality of scans. Therefore, an ink application amount per unit area of the printing medium with one main scan is small, thereby being able to reduce blotting of ink. Further, such method is preferable since variation of ink ejection performance per ejection port reduces and unevenness of density of an image also reduces. When considering the reduction of ink blotting, it is also possible to perform printing with a plurality of main scans without necessarily changing the ink ejection port to be used with regard to the same area in each main scan.

The same area on the printing medium as mentioned above may be an area onto which one of the ink ejection ports of the printing head denoted by a symbol A in FIGS. 13 and 14 can print with a single scan (an area corresponding to one raster); and also may be an area corresponding to a width of sub-scanning direction onto which a single main scan of the printing head for ejecting a certain color ink can print.

According to the present embodiment, in response to a large number or a small number of passes (the number of main scans) corresponding to quality information, use or non-use of particular color inks can be switched in order to achieve both high speed printing and high quality of an image. More specifically, when a required level for the data generation processing speed is not so high, but a sufficient color development of the gamut expressed by the particular color inks is required, namely when the number of passes is relatively high, use of the particular color inks expands the color reproduction gamut and achieves a high quality image. On the other hand, when a required level for the data generation processing speed is remarkably high, namely the number of passes is relatively small, the particular colors are not used in order to reduce the number of usable colors, thereby maintaining the data processing speed to achieve high printing speed.

Second Embodiment

In a similar manner as the first embodiment stated above, the present embodiment employs an apparatus having a structure capable of printing by use of seven color inks as stated above. The apparatus has three options of quality information such as "standard", "fine" and, in addition thereto "high-speed". If "standard" or "fine" is selected, the number of passes and colors of inks to be used are identical to those used in the first embodiment. If "high-speed" is selected, 3-pass four color printing mode without using particular color inks will be executed. That is, if the number of main scans is less than or equal to the predetermined number of times (3 times, 4 times), the particular color inks are not used. If the number of main scans is larger than the predetermined number of times (8 times), the particular color inks are used. In the present embodiment, the "information corresponding to the number of main scans" also refers to the quality information corresponding to the number of main scans. In the present embodiment, the quality information, the number of passes and use or non-use of the particular colors, and usable ink colors are related as indicated below in Table 2.

TABLE 2

| Quality Information | High-Speed | Standard | Fine |
|---|---|---|---|
| Number of Passes | 3-pass | 4-pass | 8-pass |
| Particular Colors | Non-use | Non-use | Use |
| Usable Colors | Four colors such as cyan, magenta, yellow and black | Four colors such as cyan, magenta, yellow and black | Seven colors such as cyan, magenta, yellow, black, red, green and blue |

Figure 15:
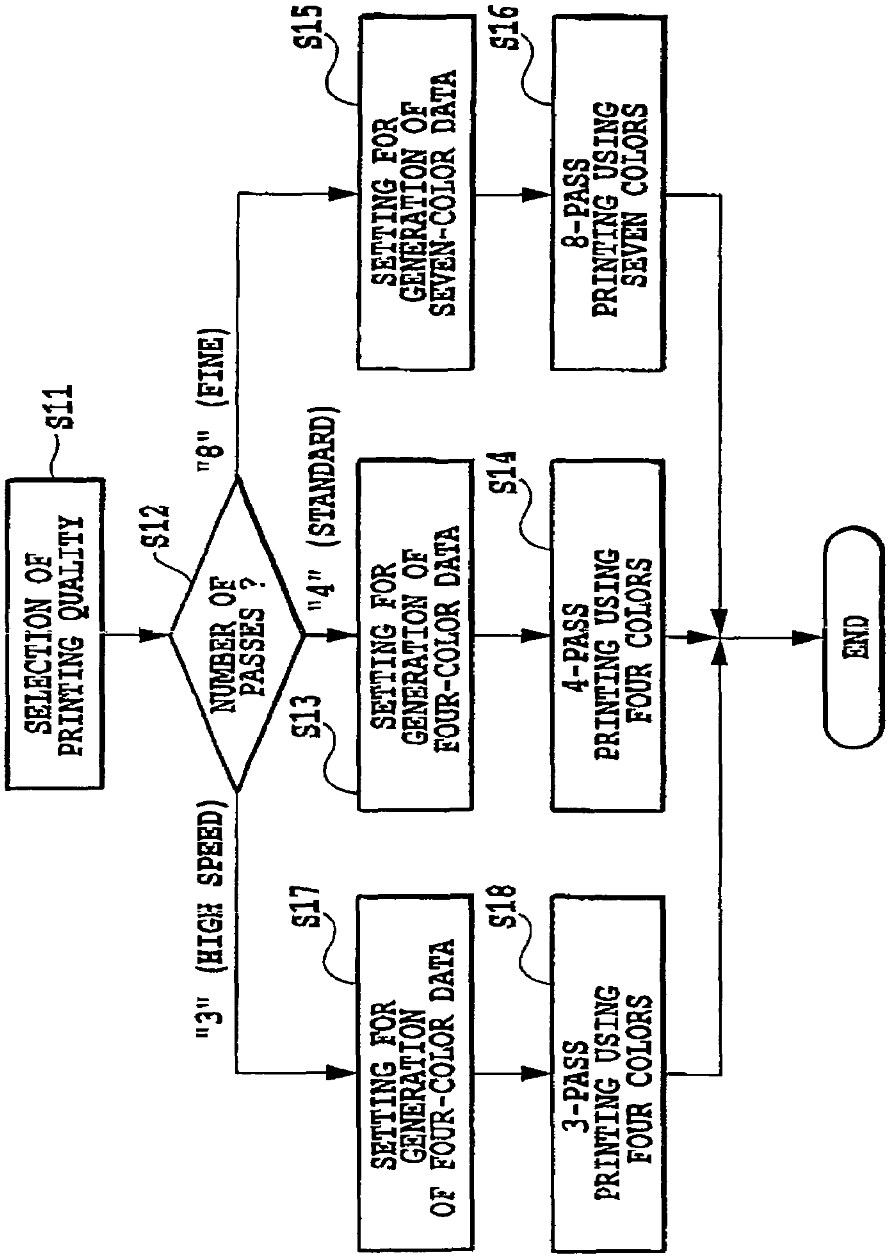
FIG. 15 is a flow chart illustrating the printing steps in a second embodiment of the present invention.

FIG. 15 is a flow chart showing printing procedures in the present embodiment.

At first, in step S11, for example, in a property screen of the printer driver which is activated according to a printing instruction from an application program, a single quality information is selected among a plurality of quality information corresponding to the number of main scans as indicated in the above Table 2. Therefore, the printer driver obtains information as to the number of main scans. The property screen for making such selection may include a radio button for the exclusive option of "high-speed" in addition to the options as shown in FIG. 12.

Once the selection of the above quality information is completed, step S12 makes a bifurcation determination, based on the information (quality information) corresponding to the number of main scans thus obtained, such that data of ink colors to be generated is determined in order to print. More specifically, if the number of main scans corresponding to the information obtained by step S11 (e.g., 4 times or 3 times) is less than or equal to the predetermined number (here, 4 times), the procedure goes forward to step S13 or S17 according to the mode to determine generation of four color data without using particular colors. On the other hand, if the number of main scans corresponding to the information obtained by step S11 exceeds the predetermined number (here, 8 times), the procedure goes forward to step S15 to determine generation of seven colors using particular colors. In other words, bifurcation determination is made in such a manner that if quality information obtained by step S11 is "high-speed" or "standard", the procedure goes forward to step S17 or S13, respectively; and if quality information obtained by step S11 is "fine", the procedure goes forward to step S15.

The processes performed by steps S13 and S14, when the quality information is "standards", are identical to those of steps S3 and S4, respectively, according to the first embodiment as stated above. Also, the processes performed by steps S15 and S16, when the quality information is "fine", are identical to those of steps S5 and S6, respectively, according to the first embodiment as stated above.

If the quality information is "high-speed", the number of main scans is less than or equal to the predetermined number (here, 3 times), namely the number of main scans is relatively small. Therefore, the data is generated such that cyan, magenta, yellow and black inks are used while the particular color inks such as red, green and blue (step S17) are not used. More specifically, RGB multi-value data is converted into multi-value data corresponding to four colors C, M, Y and K at subsequent process J0003 as shown in FIG. 4. As such data (data C, M, Y and K) is generated in accordance with the ink colors usable in the first printing mode wherein the number of passes is relatively small. Thereafter, being subjected to γ correction process J0004, halftonning process J0005 and the like, binary data corresponding to four colors C, M, Y and K is generated. Then, the procedure goes forward to step S18.

In step S18, based on binary data corresponding to four colors C, M, Y and K, the printing head is scanned in the main scanning direction with regard to the same area of the printing medium for the number of times corresponding to the above acquired information (3 times) to print onto the printing medium.

According to the present embodiment, it becomes possible to deal with large or small number of passes (the number of main scans) corresponding to the quality information delicately in addition to the effects as produced by the above first embodiment.

Third Embodiment

Similar to the second embodiment stated above, using an apparatus having structure capable of printing with seven color inks as stated above, it is possible to select any of the above stated three options as quality information. The number of passes and colors of inks to be used are identical to those of the second embodiment. In the present embodiment, however, a kind of quality information to be selected can be changed in accordance with information as to a kind of printing medium. In the present embodiment, "information corresponding to the number of main scans" refers to quality information corresponding to the number of main scans and the kind of printing medium. In the present embodiment, each of the printing medium, quality information, the number of passes and use or non-use of the particular colors, and usable ink colors are related as indicated below in Table 3.

TABLE 3

| | High-Speed | Standard | Fine |
|---|---|---|---|
| High Quality Papers | | 4-pass/ non-use of particular colors/four colors of cyan, magenta, yellow and black | 8-pass/use of particular colors/seven colors of cyan, magenta, yellow, black, red, green and blue |
| Sheets for OHP | 3-pass/ non-use of particular colors/four colors of cyan, magenta, yellow and black | 4-pass/ non-use of particular colors/four colors of cyan, magenta, yellow and black | |
| Postcards for Ink Jet Printers | 3-pass/ non-use of particular colors/four colors of cyan, magenta, yellow and black | 4-pass/ non-use of particular colors/four colors of cyan, magenta, yellow and black | 8-pass/use of particular colors/seven colors of cyan, magenta, yellow, black, red, green and blue |

Figure 16:
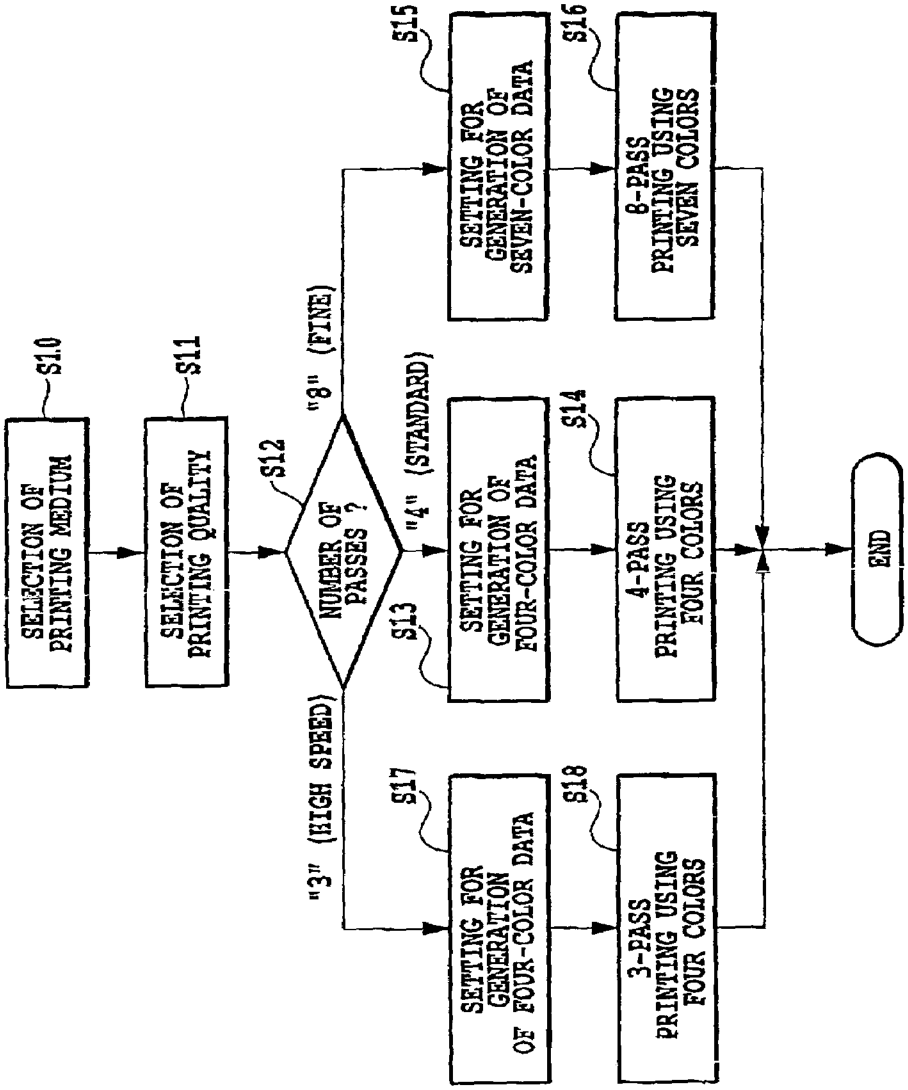
FIG. 16 is a flow chart illustrating the printing steps in a third embodiment of the present invention.

FIG. 16 is a flow chart showing printing process according to the present embodiment.

Firstly, in step S10 and S11, for example in a property screen of the printer driver activated according to printing instruction from an application program, a selection is made from a plurality of kinds of quality information corresponding to the kinds of printing medium and the number of the main scans as stated above in Table 3. Therefore, the printer driver obtains information as to the kind of printing medium to be printed and the number of main scans.

Figure 17:
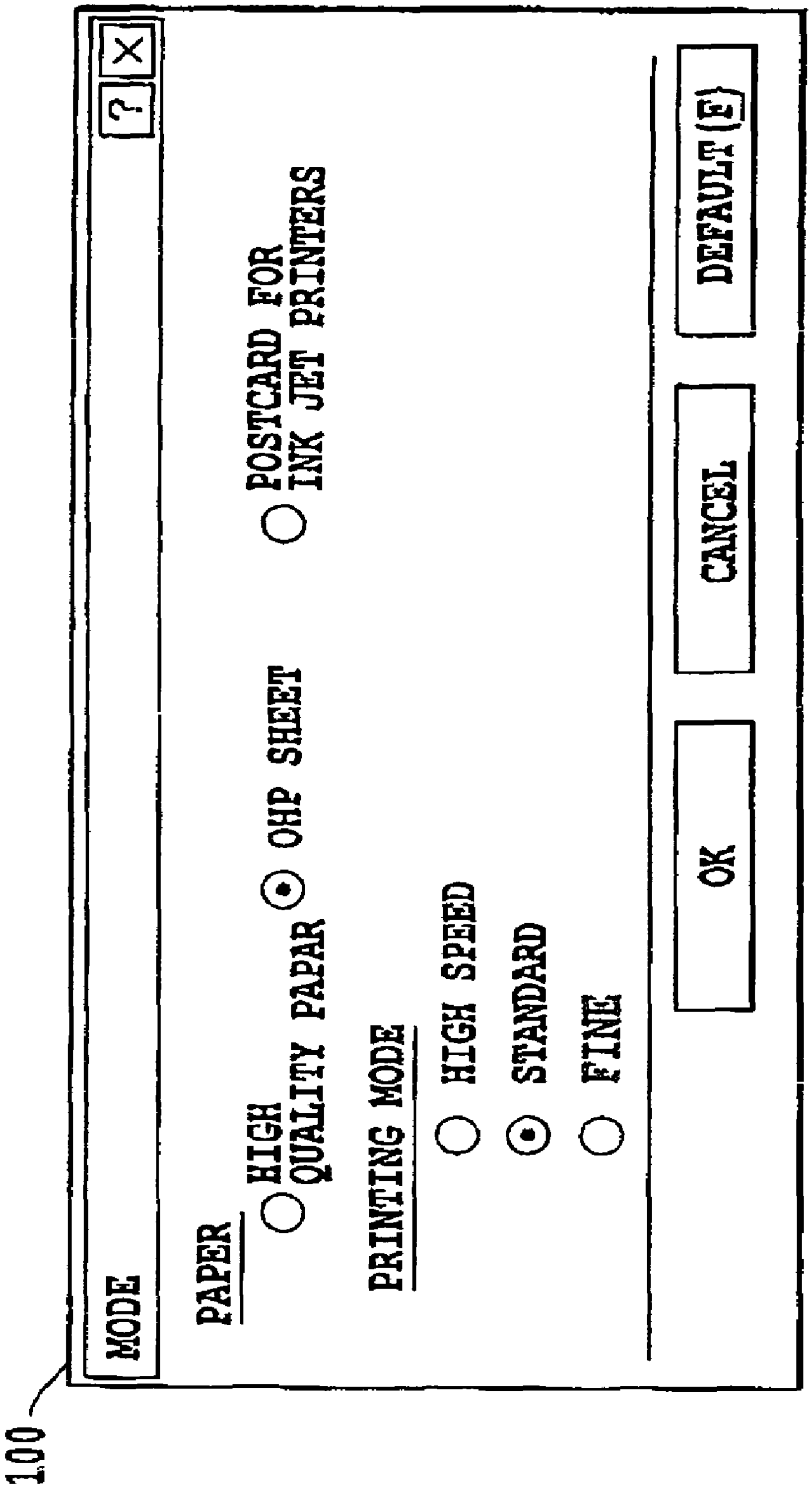
FIG. 17 is an illustration of one example of a property screen of a printer driver used in the third embodiment of the present invention.

FIG. 17 show a display example of the property screen for selecting the printing medium and quality information. The kinds of printing medium as exemplified in the present embodiment includes a "high quality paper" of a good color development that is available from Canon Kabushiki Kaisha in the name of "Professional Photo Paper", "OHP sheet" which is a permeable plastic sheet and used for overhead projectors and the like, and "postcard for ink jet printers". The quality information includes three options such as "high-speed", "standard" and "fine". A kind of quality information selectable in accordance with the kinds of the printing medium varies. That is, when the "postcard for ink jet printer" is selected, any of the three kinds of quality information can be selectable. However, when the "high quality paper" is selected, "high-speed" of quality information is not available for selection, and further, when the "OHP sheet" is selected; "fine" of quality information is not available for selection, respectively. To this end, for example, according to the information of the selected printing medium, it is preferred that the quality information radio button which is not selectable at the moment can be switched to a pale color display and an input of the selection is not acceptable as well.

The processes after the selection of the printing medium and the quality (steps S12-S18) are identical to those of the second embodiment. The present embodiment can produce similar effects as produced by the first and the second embodiments as well as, in accordance with the kind of the printing medium, printing can be performed with the proper quality and the number of passes (number of main scans) which are suitable to the feature of the selected printing medium.

Fourth Embodiment

In the first to third embodiments as stated above, it is exemplified that the present invention is applied to the system which uses seven colors composed of three particular colors such as red, green and blue in addition to four colors such as cyan, magenta, yellow and black. In the following embodiment, it is further exemplified that the present invention is applied to a system which uses inks of black, light cyan (ink having a similar color as the cyan ink but of lower density therefrom), and light magenta (ink having a similar color as the magenta ink but of lower density therefrom), and further red ink as the particular color ink, in addition to three color inks such as cyan, magenta and yellow. Colors or data, and hues of light cyan and light magenta are denoted respectively by Lc or Lm, respectively.

To use these seven colors of inks such as cyan, magenta, yellow, black, light cyan, light magenta and red, for example, printing head cartridges having structures similar to those shown in FIGS. 8-10 can be employed. However, it is a matter of course that the number of the ink tanks and printing heads, and the sequence of the arrangement thereof can be decided as required.

According to the present embodiment, as similar to the first embodiment, there are two kinds of options selectable such as "standard" and "fine" as the quality information. If "standard" is selected, 4-pass six color mode (yellow, magenta, cyan, black, light cyan and light magenta) without using the particular color (red) is executed. This mode corresponds to the first mode. If "fine" is selected as the quality information, 8-pass seven color mode using the particular color (red) is executed. This corresponds to the second mode. In the present embodiment, as stated above, printing mode is selected by the user's selection of the quality information. "Information corresponding to the number of main scans" also refers to the quality information corresponding to the number of main scans in the present embodiment. In the present embodiment, the quality information, the number of passes and use or non-use of the particular color, and usable ink colors are related as shown below in Table 4.

TABLE 4

| Quality Information | Standard | Fine |
|---|---|---|
| The Number of Passes | 4-pass | 8-pass |
| Particular Color | Non-use | Use |
| Usable Colors | Six colors such as cyan, magenta, yellow, black, light cyan and light magenta | Seven colors such as cyan, magenta, yellow, black, light cyan, light magenta and red |

In the present embodiment, control can be performed based on the procedures, the printer driver and the image processing system as shown in the first embodiment and FIG. 11 relating thereto. That is, it is preferred for the present embodiment, if, in step S2 of FIG. 11, the number of times corresponding to the information (quality information) corresponding to the number of main scans as obtained by step S1 is equal to the first number of times (here, 4 times), the procedure goes forward to step S3 to decide generation of six color data without using the particular color. On the other hand, if the number of scans corresponding to the information obtained by step S1 is equal to the second number of times (here, 8 time) which is greater than the first number of times, the procedure goes forward to step S5 to decide to generate seven color data using the particular color.

In step S3, since the number of main scans is equal to the first number of times (here, 4 times), namely since the number of main scans is relatively small, the data may be generated such that the inks of cyan, magenta, yellow, black, light cyan and light magenta are used while the particular color ink of red is not used. More specifically, RGB multi-value data is converted into multi-value data corresponding to six colors C, M, Y, K, Lc and Lm at after-step J0003 in FIG. 4, thereby generating data (C, M, Y, L, Lc and Lm data) corresponding to the usable ink colors at the first printing mode in which the number of passes is relatively small. Then, after $\gamma$ correction process J0004 and halftonning process J0005, binary data corresponding to six colors C, M, Y, K, Lc and Lm is generated and, in step S4, the printing head may scan for the first number of times (4 times) with regard to the same area of the printing medium in such a manner shown in FIG. 13 based on the binary data to print onto the printing medium.

On the other hand, in step S5, since the number of main scans is equal to the second number of times (here, 8 times) which is larger than the first number of times, namely since the number of main scans is relatively large, data may be generated such that the particular color ink of red is used in addition to the inks such as cyan, magenta, yellow, black, light cyan and light magenta. More specifically, the following process is preferable. That is, RGB multi-value data is converted into multi-value data corresponding to seven colors C, M, Y, K, Lc Lm and R at subsequent process J0003 as shown in FIG. 4, thereby generating data (data C, M, Y, K, Lc, Lm and R) corresponding to the usable ink colors at the second printing mode in which the number of passes is relatively large. Thereafter, $\gamma$ correction process J0004, halftonning process J0005 and the like are performed to generate binary data corresponding to seven colors C, M, Y, K, Lc, Lm and R. Then, in step S6, based on the binary data, the printing head performs main scans for the second number of times (8 times) that is larger than the first number of times with regard to the same area of the printing medium as shown in FIG. 14.

As stated above, when red ink is used as the particular color, substantially the same effect of the first embodiment can be produced.

Fifth Embodiment

Similar to the fourth embodiment as stated above, the apparatus having a construction in which printing can be performed with seven color inks as mentioned above is used and there are three options as the quality information identical to that referred in the second embodiment, the options including "high-speed" in addition to "standard" and "fine". If "standard" or "fine" is selected, the number of passes and the ink colors to be used are identical to those of the fourth embodiment. Also, if "high-speed" is selected, 3-pass four color printing mode (yellow, magenta, cyan and black) without using the light colors and the particular color is executed. In the present embodiment, the "information corresponding to the number of main scans" also refers to the quality information corresponding to the number of main scans. In the present embodiment, the quality information, the number of passes and use or non-use of the particular color or light colors, and usable ink colors are related as indicated below in Table 5.

TABLE 5

| Quality Information | High-Speed | Standard | Fine |
|---|---|---|---|
| Number of Passes | 3-pass | 4-pass | 8-pass |
| Particular Color | Non-use | Non-use | use |
| Usable Colors | Four colors such as cyan, magenta, yellow and black | Six colors such as cyan, magenta, yellow, black, light cyan and light magenta | Seven colors such as cyan, magenta, yellow, black, light cyan, light magenta and red |

In the present embodiment, control can be performed by using the processes, the printer drivers and the image processing system as shown in the second embodiment and FIG. 15 relating thereto. That is, in the case of the present embodiment, in step S12 of FIG. 15, bifurcation determination is made such that data of the ink colors to be generated is decided in order to print, based on the information (quality information) as to the number of main scans obtained by step S11. More specifically, if the number of scans corresponding to the information obtained by step S11 is less than or equal to the predetermined number of times (here, 4 times), namely if the number of scans is 4 or 3 times, the procedure may go forward to step S13 or S17 according to the mode to decide generation of each data such as six color data without using the particular color and four color data without using light colors other than the aforementioned non-use colors, whereas if the number of scans corresponding to the information obtained by step S15 exceeds the predetermined number of times (here, 8 times), the procedure may go forward to step S15 to decide the generation of seven color data using the particular color. That is, if the quality information obtained by step S11 is "high-speed" or "standard", the procedure may go forward to step S17 or S13, while if the quality information obtained by step S11 is "fine", bifurcation determination is made such that the procedure may go forward to step S5.

The processes to be taken when the quality information is "standard" or "fine" are respectively identical to those shown in the fourth embodiment as stated above.

If the quality information is "high-speed", since the number of main scans is less than or equal to the predetermined number of times (here, 3 times), data may be generated at step S17 such that particular color ink of red and the light color inks (light cyan and light magenta) are not used but the inks of cyan, magenta, yellow and black are used. More specifically, RGB multi-value data is converted to multi-value data corresponding to four colors C, M, Y and K at subsequent process J0003 as shown in FIG. 4. Therefore, data (data C, M, Y and K) corresponding to the ink colors usable at the first printing mode in which the number of passes is relatively small is generated. Thereafter, γ correction process J0004, halftoning process J0005 and the like are performed to generate binary data corresponding to the four colors C, M, Y and K. Then, at step S18, the printing head performs main scans onto the same area of the printing medium for the number of times corresponding to the obtained information (3 times) so as to print onto the printing medium.

The present embodiment also produces substantially the same effects as those produced by the second embodiment, Sixth Embodiment In a similar manner as stated in the fifth embodiment, the apparatus having a structure capable of printing by using seven colors of inks such as cyan, magenta, yellow, black, light cyan, light magenta and red, the selection from three kinds of quality information as stated above can be made. The number of passes and the ink colors to be used in response to the selection is identical to those in the fifth embodiment. Also, similar to the third embodiment, selectable kinds of quality information can be changed in accordance with the information as to the kinds of printing medium. In the present embodiment, the "information corresponding to the number of main scans" refers to the quality information corresponding to the number of main scans and the information of kinds of printing medium. In the present embodiment, the printing medium, the quality information, the number of passes and use or non-use of the particular color, and usable ink colors are related as represented below in Table 6.

TABLE 6

| | High-Speed | Standard | Fine |
|---|---|---|---|
| High Quality Paper A | | 4-pass/non-use of the particular color/six colors such as cyan, magenta, yellow, black, light cyan and light magenta | 8-pass/use of the particular color/seven colors such as cyan, magenta, yellow, black, light cyan, light magenta and red |
| OHP sheet | 3-pass/non-use of the particular color/four colors such as cyan, magenta, yellow, and black | 4-pass/non-use of the particular color/six colors such as cyan, magenta, yellow, black, light cyan and light magenta | |
| Postcard for Ink Jet Printer | 3-pass/non-use of the particular color/four colors such as | 4-pass/non-use of the particular color/six colors such as | 8-pass/use of the particular color/seven colors such as cyan, magenta, |

TABLE 6-continued

| | High-Speed | Standard | Fine |
|---|---|---|---|
| | cyan, magenta, yellow, and black | cyan, magenta, yellow, black, light cyan and light magenta | yellow, black, light cyan, light magenta and red |
| High Quality Paper B | 3-pass/ non-use of the particular color/six colors such as cyan, magenta, yellow, black, light cyan and light magenta | | 8-pass/use of the particular color/seven colors such as cyan, magenta, yellow, black, light cyan, light magenta and red |

In the present embodiment, control can be performed by using the processes and printer drivers, and image processing system as shown in the third embodiment and FIG. 16 related thereto. Here, in the case of the present example, in step 10 of FIG. 16, a screen for selecting kinds of the printing mediums as shown in Table 6 may be displayed on the property screen of the printer driver. That is, the property screen may display radio buttons each indicating "high quality paper A" such as "Professional Photo Paper" which is available from Canon Kabushiki Kaisha and of a good color development, "high quality paper B" such as "super photo paper" also available from Canon Kabushiki Kaisha and of a good color development, "OHP sheet" which is used for overhead projectors or the like and is permeable plastic sheet, and "postcard for ink jet printers", as the kinds of the selectable printing mediums. Similar to the third embodiment, the kinds of quality information selectable according to the features of the kinds of printing mediums varies in such a manner as indicated in Table 6.

The processes to be taken after the selection of the printing medium and quality are substantially the sane as those taken in the fifth embodiment. If the "high-speed" is selected, the next process will be diverged depending on the kind of selected printing medium whether it is the "OHP sheet" or the "postcard for ink jet printer", or the "high-quality paper B". If the latter is selected, data generation or the like may be performed such that 3-pass printing using six colors of inks is performed.

The present embodiment also produces substantially the same effects as those produced by the third embodiment.

Other Embodiment

In the above first to sixth embodiments, the "information corresponding to the number of main scans" refers to information corresponding to at least one of the information relating to the quality information or the information of kinds of printing medium. However, the present invention is not limited thereto but the "information corresponding to the number of main scans" according to the present invention may also refers to information for direct instruction of the number of main scans (numeric value information such as 4 times or 8 times). That is, the "information as to the number of main scans" may refer to either one of the information indicating the number of main scans directly or the information indicating the number of main scans indirectly as stated in the above embodiments.

Further, in the first to sixth embodiments, the cases of 3 times, 4 times and 8 times of performing passes have been explained as the specific numeric values of the number of main scans. However, those numeric values are mere examples, and thus it is a matter of course that the scope of the present invention should not be limited by those numeric values. Similarly, the number of printing modes should not be limited to the examples in this description and more printing modes may be employable. Furthermore, although the construction using inks of three primary colors such as cyan, magenta, yellow, and black and at least one ink of a particular color has been explained in the above first to sixth embodiments; however, black ink is not always necessary. That is, the present invention requires necessarily and sufficiently at least three primary colors such as cyan, magenta and yellow, and at least one particular color.

Figure 18:
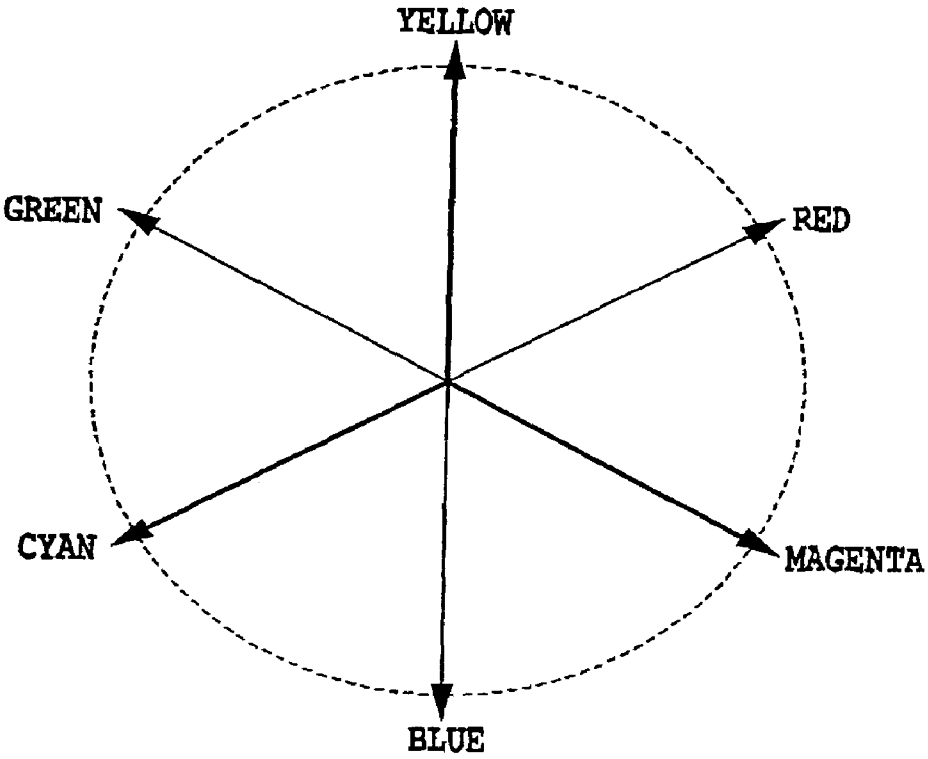
FIG. 18 is an illustration for explaining particular colors usable in the embodiments of the present invention.

Furthermore, at least one particular color that is used in the present invention is a color having a hue different from the three colors such as yellow, magenta and cyan which are the basic three color inks of subtractive primary colors. More preferably, the at least one particular color is, as shown in FIG. 18, selected from at least one of the inks such as blue ink representing a hue angle between cyan and magenta, green ink representing a hue angle between cyan and yellow, and red ink representing a hue angle between yellow and magenta respectively in the CIE-L*a*b* color space.

Still further, in the above first to sixth embodiments, the information as to the quality information such as information of the number of main scans and the information as to the kinds of printing mediums can be selected on the property screen of the printer driver. The present invention, however, is not limited thereto, but may have a structure in which such selection can be made by the printing apparatus. Namely, for example, input means for selecting the number of main scans (the number of passes) directly or indirectly is provided with the printing apparatus to allow the user to operate the input means as required in order to select and set the information. Accordingly, substantially the same function can be produced with ease even for a system that does not have a graphical user interface (GUI) at a side of the host apparatus. Also, a program for the process is not necessary to be incorporated beforehand into the printer. The program may be supplied from the printer driver of the host apparatus as required.

Still further, such printing system should also be considered as being embraced in the scope of the present invention that the system for supplying a software which realizes the functions of the embodiments as stated above or the program code of printer driver to a machine connected to various devices including the printing apparatus or the computer in the system, to cause various devices activated by the program code stored in the machine or the computer of the system, thereby realizing the function of the embodiments stated above.

In the above structure, the program code itself achieves a new function of the present invention. The program code itself, and means for supplying such program code to the computer via communication and storage media all are encompassed within the scope of the present invention.

As the storage medium for supplying the program code, any of the following mediums can be utilized: for example, flexible disks, DC-ROMs and others such as hard disks, optical disks, optical magnetic disks, CD-Rs, DVDs, magnetic tapes, nonvolatile memory cards and ROMs.

Also, the present invention includes not only the case that execution of the program code read out by the computer achieves the functions of the embodiment stated above, but also includes the case that, based on the instruction of the program code, OS and the like being activated on the computer performs a part or all of the actual processes, thereby realizing the functions of the present embodiment.

Furthermore, the scope of the present invention also encompasses the case that the program code read out from the storage medium is written in a memory stored in a function expanding board inserted into the computer or a function expanding unit connected to the computer, and then, based on the instruction of the program code, CPU or the like incorporated into the function expanding board or the function expanding unit performs a part or all of the actual processes, thereby achieving the function of the present embodiment.

Additionally, a configuration of the printing system may include, regardless of personal use, business use or industrial use, an image data supplying device such as a computer, scanner or digital camera and a printer as an image output terminal, in addition to, for example, a copying machine having a scanner and a printing apparatus all in one, a facsimile machine having a data transfer device and a printer all in one, a word processor or electric typewriter each having a printer, and a digital camera having a printer therein.

(Inks)

Examples of inks preferred to be used in the present invention are shown hereinafter such as inks of yellow, magenta, cyan and black that are basic colors and particular colors such as red, green and blue inks. Those inks essentially include colorants.

As the colorants for the inks of the present invention, known colorants such as normally used dye or pigment or colorants newly compounded can be used by selection as required within the scope of the present invention.

Dyes and pigments can be used as colorants to be used for inks of the primary colors (three primary colors such as yellow, magenta and cyan in addition to black) according to the present embodiment. Especially, the dyes are excellent in reproducing colors of high lightness so that it is preferred to use them. Similarly, as the colorants for the inks of the particular colors (red, green and blue), the dyes and pigments can be used. Especially, the dyes are excellent in reproducing the colors having high lightness so that it is preferred to use them.

It is especially preferred to use ink of which colorant permeates into the printing medium after the attachment thereto (dye type ink is more likely to permeate into the printing medium) than to use ink of which colorant aggregates on a surface of the printing medium (pigment type ink is more likely to aggregates on the surface of the printing medium). In the latter, most of the incident light is reflected back from the uppermost ink layer which adheres at last, whereas in the former, the incident light is reflected back from each ink layer formed in the printing medium; so that a spatial effect and clarity are expected to appeal. Further, when ink droplets are attached to a glossy paper which is often used for photo-output or a glossy medium such as a glossy film, the colorant stays in a receiving layer and a status of a portion to which printing was done and a status of a portion to which printing was not done of the printing medium both are preserved, resulting in keeping the glossiness. In this regard, the glossy papers are preferable to form an image having a good texture corresponding to a silver-salt photo.

More preferable, the embodiments use dyes as colorants as the printing agents for primary colors such as yellow, magenta, cyan, especially, acid dye and direct dye. Particularly, acid dye and direct dye are suitably used since they are capable of producing a good development with various printing medium to be printed thereon, such as plain paper and special printing media including a coating layer or an ink receiving layer on the surfaces, the special printing medium being so-called glossy paper, coated papers, glossy films.

Further, the particular color ink is preferable since, by using inks capable of expressing a high lightness higher than that of a color reproduction gamut expressed by a combination of the primary colors, it can effectively express an image formation having impact in which gamut is expanded by adding particular color.

Figure 19:
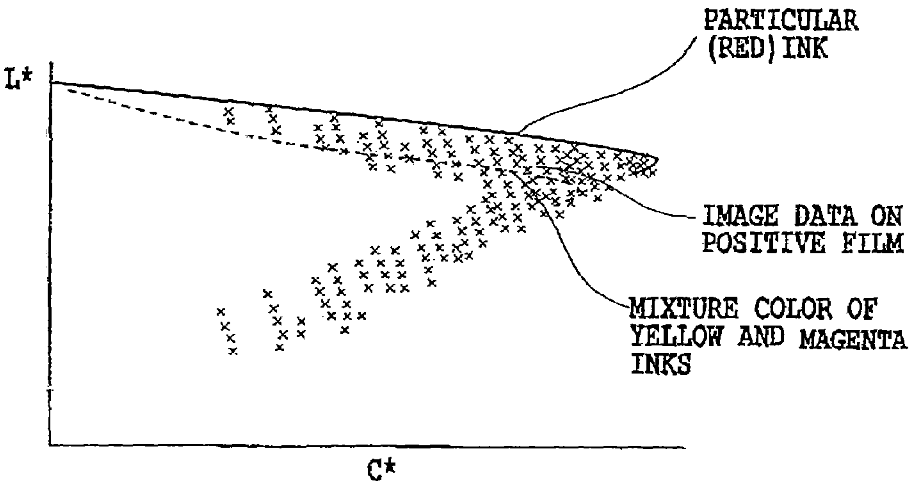
FIG. 19 is a schematic illustration of the relationship between the lightness and the chroma of a color formed by the mixture of yellow and magenta, a color formed by red which is a color of particular color ink, and a color represented by a positive film.

Specifically, if an image is formed using, for example, yellow and magenta inks and the particular color ink, then on CIE-L*a*b* color space, the color expressed by the particular color ink on the printing medium has a higher lightness than the color reproduction area expressed by an arbitrary combination of at least the yellow and magenta inks. Further, the hue angle of the color expressed by the particular color ink on the printed medium corresponds to red such as the one in the color reproduction area. Furthermore, preferably, the color expressed or the print medium by the red ink, which is the particular color ink, has a higher chroma saturation than the color reproduction area, FIG. 19 is a schematic view showing, for the purpose of explanation of this condition, a relationship between lightness (L*) and chroma ($c^*;c^*=(a^{*2}+b^{*2})^{1/2}$) of each of a color formed of red as the particular color, a mixture of yellow and magenta and a color expressed by a positive film. Use of inks capable of expressing colors of high lightness increases brightness of colors in orange or red area, resulting in that clarity and spatial effect of the printing medium can be expressed. On the other hand, if lightness is low, even if the orange or red area has an increased chroma saturation, only a printing image without good contrast and spatial effect can be produced. Hence, it is difficult to output a targeted image that corresponds to the image produced with the positive film. The above condition is similarly applicable to relationships of inks between yellow and cyan and green, and between magenta and cyan and blue.

In the present embodiment in which inks such as yellow, magenta, cyan, black, red, green and blue are used, these primary color inks and the particular color inks are exemplified as stated below, from which one suitable to the above condition can be selected.

Colorants for Cyan

C. I. direct blue: 1, 15, 22, 25, 41, 76, 77, 80, 86, 90, 98, 106, 108, 120, 158, 163, 168, 199, 226, 307

C. I. acid blue: 1, 7, 9, 15, 22, 23, 25, 29, 40, 43, 59, 62, 74, 78, 80, 90, 100, 102, 104, 112, 117, 127, 138, 158, 161, 203, 204, 221, 244

Colorants for Yellow

C.I. direct yellow: 8, 11, 12, 27, 28, 33, 39, 44, 50, 58, 85, 86, 87, 88, 89, 98, 100, 110, 132, 173

C. I. acid yellow: 1, 3, 7, 11, 17, 23, 25, 29, 36, 38, 40, 42, 44, 76, 98, 99

Colorants for Magenta

C. I. direct red: 2, 4, 9, 11, 20, 23, 24, 31, 39, 46, 62, 75, 79, 80, 83, 89, 95, 197, 201, 218, 220, 224, 225, 226, 227, 228, 229, 230

C. I. acid red: 6, 8, 9, 13, 14, 18, 26, 27, 32, 35, 42, 51, 52, 80, 83, 87, 89, 92, 106, 114, 115, 133, 134, 145, 158, 198, 249, 265, 289

C. I. food red: 87, 92, 94

C. I. direct violet 107

Other than the above, compounds or the like having structures as disclosed in Japanese Patent Application Laid-open No. 2002-069348 can also be used.

Colorants for Black

C. I. direct black: 17, 19, 22, 31, 32, 51, 62, 71, 74, 112, 113, 154, 168, 195

C. I. acid black: 2, 48, 51, 52, 110, 115, 156

C. I. food black: 1, 2 carbon black

Other than the above, compounds or the like having structures as disclosed in International Patent Publication No. WO00/4345 can also be used.

Colorants for Red

C. I. acid orange: 7, 10, 33, 56, 67, 74, 88, 94, 116, 142

C. I. acid red: 111, 114, 266, 374

C. I. direct orange: 26, 29, 34, 39, 57, 102, 118

C. I. food yellow: 3

C. I. reactive orange: 1, 4, 5, 7, 12, 13, 14, 15, 16, 20, 29, 30, 84

C. I. disperse orange: 1, 3, 11, 13, 20, 25, 30, 31, 32, 47, 55, 56

Other than the above, a mixture of the above colorants for yellow and magenta can be used if mixed properly.

Colorants for Green

C. I. acid green: 5, 6, 9, 12, 15, 16, 19, 21, 25, 28, 81, 84

C. I. direct green: 26, 59, 67

C. I. food green; 3

C. I. reactive green: 5, 6, 12, 19, 21

C. I. disperse green: 6, 9

C. I. disperse orange: 1, 3, 11, 13, 20, 25, 30, 31, 32, 47, 55, 56

Other than the above, a mixture of the above colorants for yellow and cyan can be used if mixed properly.

Colorants for Blue

C. I. acid blue: 62, 80, 83, 90, 104, 112, 113, 142, 203, 204, 221, 244

C. I. reactive blue: 49

C. I. pigment blue 15: 6

C. I. acid violet: 19, 48, 49, 54, 129

C. I. direct violet: 9, 35, 47, 51, 66, 93, 95, 99

C. I. reactive violet: 1, 2, 4, 5, 6, 8, 9, 22, 34, 36

C. I. disperse violet: 1, 4, 8, 23, 26, 28, 31, 33, 35, 38, 48, 56

Other than the above, a mixture of the above colorants for magenta and cyan can be used if mixed properly.

A content of the above colorants to be included in the ink is suitable in a range between 0.1 and 15 percent by mass with regard to the entire mass of ink. Also, the colorants to be included in the ink can be used singularly or in a mixture of two or more colorant. Also, colorants to be used for the particular color is used as required in the scope of the present invention selectively from a single colorant, a mixture of two or more of the colorants having similar hues, a mixture of the colorants each having hue of yellow, magenta and cyan, or the like.

Furthermore, as required, inks used in the ink jet printing apparatus of personal use may include, for example, water as carrier ingredient in addition to water-soluble organic solvent, humectant, surface-active agent, pH adjuster, antiseptic agent and the like.

That any water-soluble organic solvent can be used without limitation as far as it is water-soluble, so that any solvent as normally used as an ink used in the ink jet printer such as alcohol, poly alcohol, polyglycol, glycol ether, nitrogenous polar solvent sulfurous polar solvent, urea, saccharides and derivatives thereof may be used without problem. These solvents are used for the purpose of maintaining ink moisture retention, improving solubility, dispersion property of colorants, and ink permeating agent into printing medium. Further, these solvents can be used separately or in a combination of a plurality of the solvents.

An amount of water-soluble organic solvent is normally preferable between 1 and 50 percent by mass, more preferably between 3 and 40 percent by mass. Also, the amount of water included in ink is preferably between 30 and 95 percent by mass for a suitable retention of the solubility of colorant and ejection stability of ink.

Further, surface-active agent includes negative ion surface active agent such as fatty acid salts, salts of sulfate esters of higher alcohols, liquid fatty oil alkyl sulfates, alkyl aryl sulfonates, and non-ionic surface-active agent such as polyoxyethylene alkyl ethers, polyoxyethylene alkyl esters, polyoxyethylene sorbitan alkyl esters, acetylene alcohol, acetylene glycol. One or more of those agents can be used as required. More specifically, acetylene alcohol or acetylene glycol is preferred to be used since they have an excellent permeability to plain paper. An amount of such agents to be used is preferably between 0.01 and 5 percent by mass, although the preferable amount thereof defers according to a kind of surface active agent to be used. Here, a preferable amount of the surface active agent to be added is determined such that a preferable surface tension of ink at 25 degree of the ink temperature is 10 mN/m(dyn/cm) or more, more preferably 20 mN/m or more, and the surface tension does not exceed 60 mN/m. This is because the ink jet printing mode used in the present invention is capable of effectively preventing the occurrence of kink of printing (deviation of landing point of ink droplet) due to wet condition of nozzle end.

Furthermore, to produce a good ejecting property in the ink jet printing apparatus, it is preferable that ink is adjusted so as to have a desired viscosity and pH.

(Printing Medium)

The printing media that can be used in the present invention are normally used a printing media such as a special medium having a coating layer or an ink receiving layer on a surface thereof, that is so-called plain paper, or glossy paper, coated paper and glossy film. Among those, an example of the print medium that can produce an image having better brightness, contrast and clarity is a special medium having a hydrophilic porous particle layer and porous polymer molecule layer and the like on a base material. The example of the special medium for the printing medium used in the present invention is described in detail hereinafter. The special medium has a structure to cause the colorants such as dye and pigment to adhere to particles having hydrophilic porous structure within the ink receiving layer to form an image by at least the colorants adhered. Such special medium is especially suitable to be used for an ink jet printing method. As the printing medium such as stated above, a so-called absorbing type in which a space formed in the ink receiving layer on a supporting body absorbs ink is preferred.

The ink receiving layer of the absorbing type printing medium is structured to have particles as a main structure and as required the structure includes hydrophilic porous layer for holding binder or the other type of additives. The particles are exemplified by inorganic pigment such as silica, clay, talc, calcium carbonate, kaolin, alminium oxide such as almina or almina hydrate, diatomite, titanium oxide, hydrotalcite, zinc oxide and organic pigment such as urea formalin resin, ethylene resin, styrene resin. One or more of those may be used.

A suitable binder to be used includes water-soluble high polymer and latex. For example, the followings are used independently or in a combination of two or more of them; polyvinyl alcohol or derivatives thereof, starch or derivatives thereof, gelatin or derivatives thereof, acacia gum, cellulose derivatives such as carboxymethyl cellulose, hydroxyethyl cellulose and hydroxypropylmethyl cellulose, SBR latex, NBR latex, methyl methacrylate-butadiene copolymer latex, vinyl copolymer latex such as ethylene-vinyl acetate copolymer, polyvinyl pyrolidone, maleic anhydride and copolymer thereof, acryl ester copolymer and etc. Other than the above, additives can be also used as required, for example, dispersing agent, bodying agent, pH controlling agent, lubricant, flow denaturant, surface active agent, antifrothing agent, die lubricant, fluorescent bleach, ultraviolet absorber, antioxidant are also used.

It is a matter of course that the particular color ink can be used with regard to the printing mediums which does not have the ink receiving layer on the base material (for example, plain papers). Such mode is not excluded from the scope of the present invention.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

This application claims priority from Japanese Patent Application No. 2003-291874 filed Aug. 11, 2003, which is hereby incorporated by reference herein.

What is claimed is:

1. An ink jet printing method in which a printing head capable of ejecting three colors of inks such as cyan, magenta and yellow and a particular color ink having a hue different from those of the three colors carries out a plural number of main scans relative to the same area of a printing medium, the method comprising the steps of:

obtaining information corresponding to the number of main scans; and printing onto the printing medium causing the printing head to carry out main scans for the number of times corresponding to the obtained information with regard to the same area of the printing medium, wherein, the printing step is performed without using the particular color ink when the number of times corresponding to the obtained information is less than or equal to a predetermined number of times, and the printing step is performed allowing the particular color ink to be used when the number of times corresponding to the obtained information exceeds the predetermined number of times.

2. An ink jet printing method according to claim 1, further comprising a step of selecting a single item of information among a plurality of items of information corresponding to different numbers of the main scans for obtaining the information in obtaining step.

3. An ink jet printing method according to claim 1, wherein the information corresponding to the number of main scans refers to at least one of information regarding printing quality of an image or information regarding a kind of printing medium, and wherein the number of main scans is decided based on at least one of the types of information.

4. An ink jet printing method including a main scanning operation in which a printing head having a plurality of ink ejection ports for ejecting three colors of inks such as cyan, magenta and yellow and a particular color ink having a hue different from the three colors, the ink ejection ports being arranged in the printing head, carries out main scans relative to a printing medium in a direction different from the arrangement direction of the ink ejection ports, and a sub-scanning operation in which the printing medium is sub-scanned in a direction orthogonal to the main scanning direction relative to the printing head, the method comprising the steps of:

selecting a single printing mode for printing from among a plurality of printing modes including a first printing mode in which the printing head carries out main scans to print onto the same area of the printing medium for a first number of times, and a second printing mode in which the printing head carries out main scans to print onto the same area of the printing medium for a second number of times that is greater than the first number of times; and printing onto the printing medium by the selected printing mode, wherein the printing step performs printing without using the particular color ink when the first printing mode is selected, and the printing step performs printing allowing the particular color ink to be used when the second printing mode is selected.

5. An ink jet printing method according to claim 4, wherein the printing head is capable of ejecting black ink, light cyan ink of a similar color as the cyan ink but of lower density and light magenta ink of a similar color as the magenta ink but of lower density, and wherein the printing step is performed using the inks of cyan, magenta, yellow, black, light cyan and light magenta when the first printing mode is selected, and the printing step is performed using the inks of cyan, magenta, yellow, black, light cyan, light magenta and the particular color when the second printing mode is selected.

6. An ink jet printing method according to claim 4, further comprising a step of generating color data of inks corresponding to the printing mode selected in the selecting step, wherein the printing step performs printing based on the generated color data, and wherein the data generation step suspends generation of color data of the particular color ink when the first printing mode is selected, and is capable of generating color data of the particular color ink when the second printing mode is selected.

7. An ink jet printing method according to claim 6, wherein the data generation step converts RGB multi-value data into multi-value data of ink colors corresponding to the selected printing mode.

8. An ink jet printing method according to claim 4, wherein the selection of the printing mode is executed by selecting at least one item of information from either of information regarding quality of an image or information regarding a kind of printing medium.

9. An ink jet printing method according to claim 1, wherein the particular color ink is capable of expressing lightness higher than those of a color reproduction gamut expressed on the printing medium by a combination of any two of the three primary colors such as cyan, magenta and yellow in a CIE-L*a*b* color space, and is an ink of color representing hue angle of the color reproduction gamut expressed by the combination.

10. An ink jet printing method according to claim 1, wherein the particular color ink is at least one ink selected from the group of a blue ink representing a hue angle between cyan and magenta, a green ink representing a hue angle between cyan and magenta, and a red ink representing a hue angle between yellow and magenta.

11. An ink jet printing method according to claim 1, wherein the same area on the printing medium refers to an area onto which one of ink ejection ports of the printing head is capable of printing by a single main scan.

12. An ink jet printing method according to claim 1, wherein the same area of the printing medium refers to an area onto which all of a plurality of the ink ejection ports of the printing head which eject the same color ink are capable of printing by a single main scan.

13. A computer-readable medium storing a program for causing a printing head capable of ejecting three color inks such as cyan, magenta and yellow and a particular color ink having a hue different from those of the three colors to carry out a plurality of main scans relative to the same area of a printing medium to print on the print medium, the program causing a computer to execute the steps of:

obtaining information regarding the number of main scans; and generating data corresponding to the three color inks but suspending generation of data corresponding to the particular color ink when the number of times corresponding to the obtained information is less than or equal to a predetermined number of times, and generating data corresponding to the particular color ink and the three color inks when the number of times corresponding to the obtained information exceeds the predetermined number of times.

14. A computer-readable medium storing a program for causing a printing head capable of ejecting inks of three colors such as cyan, magenta and yellow and a particular color ink to carry out a plurality of main scans relative to the same area of a printing medium, the program causing the computer to execute the steps of:

obtaining information regarding one printing mode selected from a plurality of printing modes including a first printing mode in which the printing head is main scanned relative to the same area of the printing medium a first number of times to print on the same area of the printing medium, and a second printing mode in which the printing head is main scanned relative to the same area of the printing medium a second number of times that is greater than the first number of times to print on the same area of the print medium; and generating data corresponding to the three color inks but suspending generation of data corresponding to the particular color ink when the obtained information is information regarding the first printing mode, and generating data corresponding to the particular color ink and the three color inks when the obtained information is information regarding the second printing mode.

15. An ink jet printing apparatus in which a printing head capable of ejecting inks of three colors such as cyan, magenta and yellow and a particular color ink having a hue different from those of the three colors carries out a plurality of main scans relative to the same area of a printing medium to print thereon, the apparatus comprising:

a plurality of printing modes including a first printing mode for causing the printing head to be main scanned relative to the same area of the printing medium a first number of times to print on the same area of the printing medium, and a second mode for causing the printing head to be main scanned relative to the same area of the printing medium a second number of times that is greater than the first number of times to print on the same area of the printing medium; and means for printing without using the particular color ink when the first printing mode is selected, and for printing using the particular color ink when the second printing mode is selected.

* * * * *

UNITED STATES PATENT AND TRADEMARK OFFICE
CERTIFICATE OF CORRECTION

PATENT NO. : 7,408,676 B2
APPLICATION NO. : 10/912113
DATED : August 5, 2008
INVENTOR(S) : Yazawa et al.

It is certified that error appears in the above-identified patent and that said Letters Patent is hereby corrected as shown below:

COLUMN 4:
Line 57, "modes" should read --mode--.

COLUMN 8:
Line 30, "(ADD)" should read --(HDD)--.
Line 42, "1004" should read --1004.--.

COLUMN 9:
Line 3, "halftonning" should read --halftoning--.
Line 29, "Halftonning" should read --Halftoning--.

COLUMN 10:
Line 44, "halftonning" should read --halftoning--.
Line 55, "halftonning" should read --halftoning--.
Line 56, "halftonning" should read --halftoning--.

COLUMN 11:
Line 30, "mounted" should read --mounted.--.

COLUMN 12:
Line 32, "photolithograpy" should read --photolithography--.

COLUMN 13:
Line 3, "H-1100" should read --H1100--.
Line 26, "U1500," should read --H1500,--.
Line 30, "1H1200," should read --H1200,--.
Line 65, "vltage" should read --voltage--.

COLUMN 14:
Line 22, "a" should read --an--.

COLUMN 15:
Line 31, "halftonning" should read --halftoning--.
Line 50, "second," should read --second--.

UNITED STATES PATENT AND TRADEMARK OFFICE
CERTIFICATE OF CORRECTION

PATENT NO. : 7,408,676 B2
APPLICATION NO. : 10/912113
DATED : August 5, 2008
INVENTOR(S) : Yazawa et al.

It is certified that error appears in the above-identified patent and that said Letters Patent is hereby corrected as shown below:

COLUMN 16:
Line 7, "a" should be deleted.

COLUMN 17:
Line 50, "standards"," should read --"standard",--.

COLUMN 18:
Line 1, "halftonning" should read --halftoning--.

COLUMN 19:
Line 16, "selected;" should read --selected,--.

COLUMN 20:
Line 29, "time)" should read --times)--.
Line 44, "halftonning" should read --halftoning--.
Line 63, "halftonning" should read --halftoning--.

COLUMN 22:
Line 16, "ning" should read --ing--.
Line 23, "embodiment," should read --embodiment.--.

COLUMN 23:
Line 37, "sane" should read --same--.
Line 57, "refers" should read --refer--.

COLUMN 25:
Line 44, "aggregates" should read --aggregate--.

COLUMN 26:
Line 17, "or" should read --on--.
Line 19, "area," should read --area.--.

UNITED STATES PATENT AND TRADEMARK OFFICE

CERTIFICATE OF CORRECTION

PATENT NO. : 7,408,676 B2
APPLICATION NO. : 10/912113
DATED : August 5, 2008
INVENTOR(S) : Yazawa et al.

It is certified that error appears in the above-identified patent and that said Letters Patent is hereby corrected as shown below:

COLUMN 28:
Line 37, “used a” should read --used--.

COLUMN 29:
Line 53, “in” should read --in the--.

Signed and Sealed this

Third Day of March, 2009

JOHN DOLL
*Acting Director of the United States Patent and Trademark Office*